United States Patent
Wagner

(10) Patent No.: US 9,639,238 B2
(45) Date of Patent: May 2, 2017

(54) MODIFICATION OF A CHARACTERISTIC OF A USER INTERFACE OBJECT

(71) Applicant: APPLE INC., Cupertino, CA (US)

(72) Inventor: Peter K. Wagner, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 144 days.

(21) Appl. No.: 14/069,522

(22) Filed: Nov. 1, 2013

(65) Prior Publication Data
US 2014/0282150 A1 Sep. 18, 2014

Related U.S. Application Data

(60) Provisional application No. 61/784,190, filed on Mar. 14, 2013.

(51) Int. Cl.
| | |
|---|---|
| *G06F 3/0484* | (2013.01) |
| *G06F 3/048* | (2013.01) |
| *G06F 3/041* | (2006.01) |
| *G06F 3/0482* | (2013.01) |
| *G06F 3/0488* | (2013.01) |

(52) U.S. Cl.
CPC ........ *G06F 3/0482* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 6,195,094 B1 * | 2/2001 | Celebiler | 715/764 |
| 8,473,871 B1 * | 6/2013 | Sandler | G06F 3/0481 715/765 |
| 8,525,855 B1 * | 9/2013 | Freyhult | G06F 3/0481 345/660 |

(Continued)

OTHER PUBLICATIONS

TechTutor.TV, "Resize the Slides and Notes Pane PowerPoint 2007", May 21, 2009, YouTube, https://www.youtube.com/watch?v=OAV6ngMliTs, document in PDF format by Nhat-huy Nguyen.*

(Continued)

*Primary Examiner* — Jeffrey A Gaffin
*Assistant Examiner* — Nhat-Huy T Nguyen
(74) *Attorney, Agent, or Firm* — Morgan, Lewis & Bockius LLP

(57) ABSTRACT

Multiple operations can be determined based on different gestures received at a single control. An operation can be a selection or a de-selection (or activation and deactivation) of a feature (or tool) while another operation can be a configuration of a characteristic associated with the feature. The other operation can set a configuration of the characteristic associated with the feature such that upon re-activation of the feature, the configured characteristic may be persisted. Embodiments provide a UI control that can receive multiple types of gestures and determine an operation to perform based on the type of gesture. For instance, in response to receiving a gesture input at a single control, an application may cause a display panel on a GUI to be displayed. The panel configuration (e.g., size of the panel, size of objects in the panel) can be modified in response to receiving another gesture input at the control.

19 Claims, 21 Drawing Sheets

(56) References Cited

U.S. PATENT DOCUMENTS

| | | | |
|---|---|---|---|
| 2004/0243940 A1* | 12/2004 | Lee .................. | G06F 3/04897 715/744 |
| 2006/0026521 A1 | 2/2006 | Hotelling et al. | |
| 2007/0126708 A1* | 6/2007 | Yang .................. | G06F 3/04883 345/173 |
| 2007/0252822 A1* | 11/2007 | Kim .................. | G06F 3/0362 345/173 |
| 2013/0145309 A1* | 6/2013 | Cho .................. | G06F 3/0488 715/784 |

OTHER PUBLICATIONS

ISO 9241-14, "Ergonomic Requirements for Office Work With Visual Dis[play Terminals (VDTs)," Part 14: Menu Dialogues, 1997, 64 pages.

International Search Report and Written Opinion for International PCT Application No. PCT/US2014/015402, mailed Jun. 2, 2014, 11 pages.

International Preliminary Report on Patentability, dated Sep. 15, 2015, received in International Patent Application No. PCT/US2014/015402, which corresponds with U.S. Appl. No. 14/069,522, 8 pages.

* cited by examiner

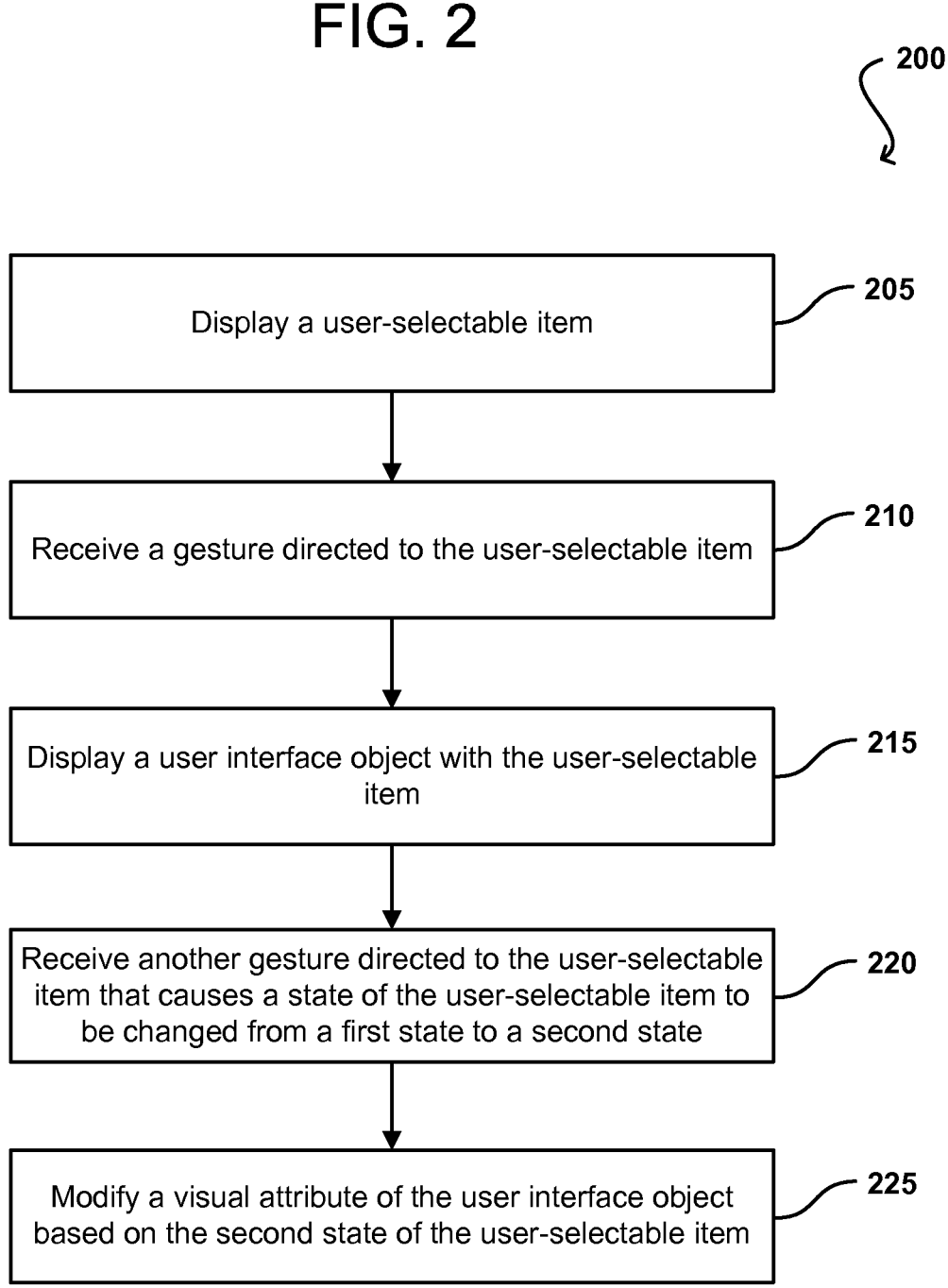

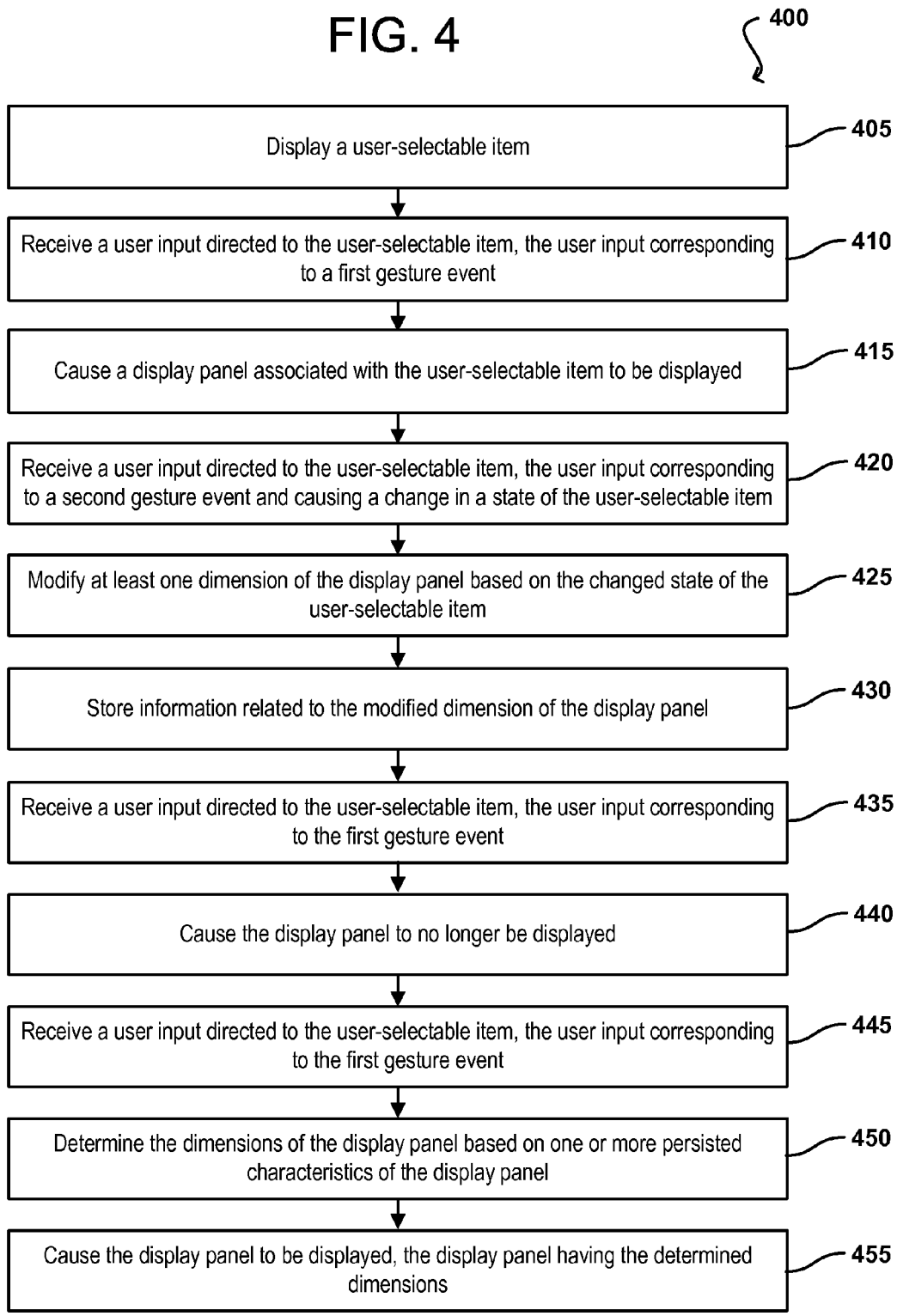

MODIFICATION OF A CHARACTERISTIC OF A USER INTERFACE OBJECT

BACKGROUND

The disclosed embodiments relate generally to touch interfaces and more particularly to improved techniques for operating and configuring a user interface object using touch gestures.

Many of today's computing devices, such as desktop computers, personal computers, laptop computers, tablet computers, mobile phones, and media players can provide a wide range of capabilities. A user of a computing device may request for various enhanced functionalities to be performed, for example, in a software application, by selecting and manipulating user interface elements presented by the software application. With limited screen real estate on the computing devices, the number of user interface elements presentable on the user interface is limited. The user is often required to select and manipulate multiple user interface elements in order to trigger the functionalities provided by an application.

For example, the user may select a user interface element (e.g., a button) in a photo editing application to cause the application to display a thumbnail panel including a series of images. The user may select another user interface element (e.g., another button) in the application to modify a size of the thumbnail panel. In order to configure the size of the thumbnail panel, the user must perform multiple actions by selecting and manipulating multiple user interface elements. For example, the user can configure the size of the thumbnail panel through a series of actions performed in a preferences setting. The configuration can sometimes be unintuitive and cumbersome for the user.

BRIEF DESCRIPTION OF THE DRAWINGS

Various embodiments in accordance with the present disclosure will be described with reference to the drawings, in which:

FIG. 2 is a flow diagram of illustrative process of some embodiments for displaying and modifying a user interface object in response to different gestures directed at a single user interface control.

FIG. 4 is a flow diagram of illustrative process of some embodiments for displaying a user interface object according to its persisted characteristics.

DETAILED DESCRIPTION

Figure 1:
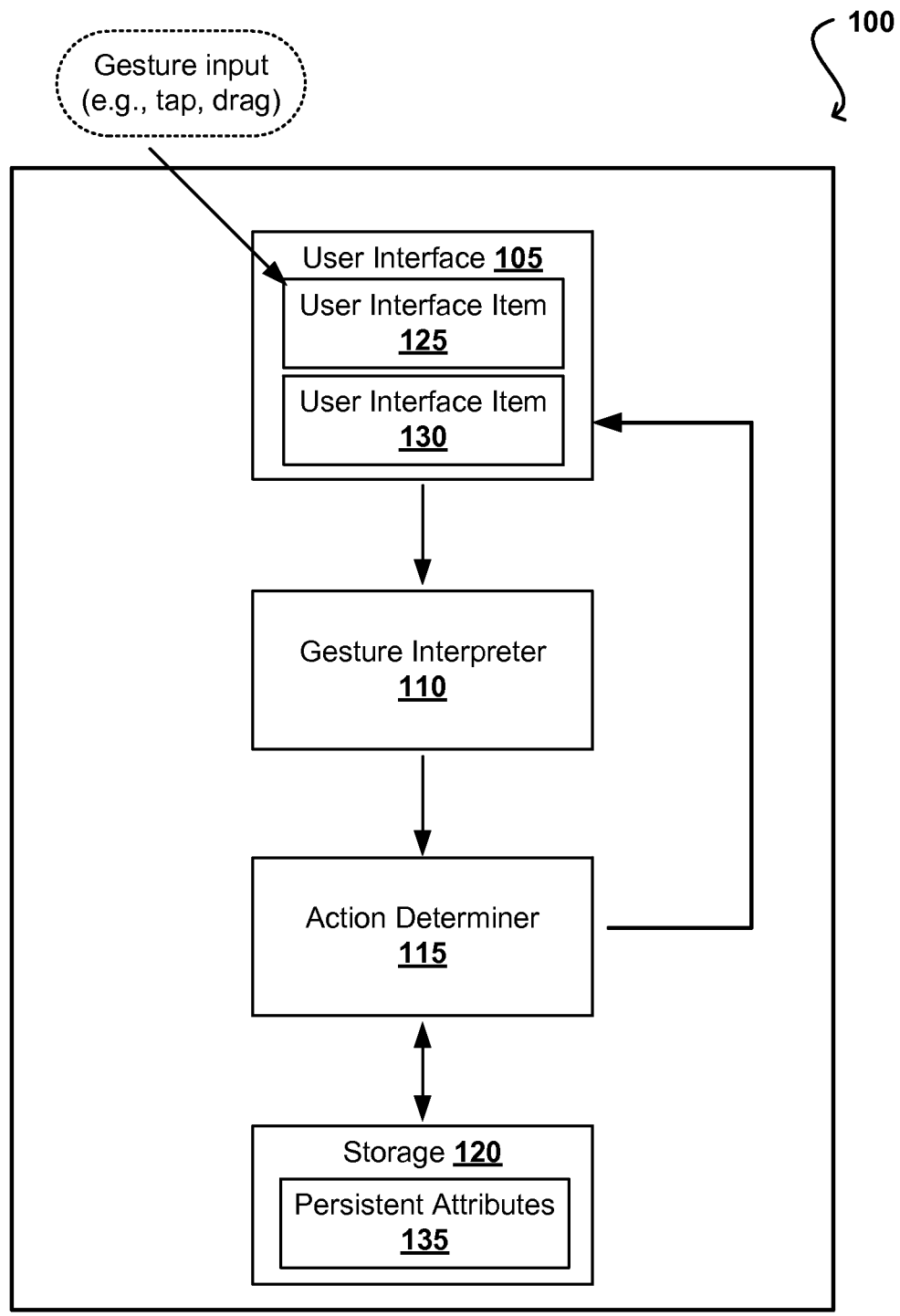
FIG. 1 is a schematic block diagram illustrating an embodiment of a system for interpreting a user input (e.g., a gesture) and performing an operation corresponding to the user input.

Certain embodiments of the present invention can provide a single user interface element (also referred to as user interface item or user interface object throughout) for performing multiple operations. In response to receiving a gesture input at the user interface element, a computing device can determine an operation corresponding to the gesture input directed at the user interface element and perform the determined operation.

In some embodiments, an application can provide one or more user interfaces. For example, a database application can display a user interface that presents a template for organizing a user's contacts, projects, events, etc. A user interface can include one or more user interface elements, such as tabs, content boxes, display panels, editable fields, selectable items, etc. A number of user interface elements can be displayed on each user interface to enable the user of the application to cause the application to perform various operations.

In some embodiments, a user interface element can receive different types of gesture input. A single user interface element displayed on a user interface provided by the application can be used to perform multiple operations in response to different types of gesture input. For example, the application may perform a first operation in response to receiving a first type of gesture input (e.g., a tap gesture) with respect to the user interface element. The application may perform a second operation, different from the first operation, in response to receiving a second type of gesture input (e.g., a drag gesture) with respect to the same user interface element.

According to one non-limiting example, a user interface element may be provided that can be used to display a display panel and also to set the size (e.g., length, width, etc.) of the display panel. Tapping the user interface element by a user may cause the associated display panel to be displayed. The same user interface element can be dragged by the user to set the size of the display panel. In this manner, different operations can be performed using the same user interface element in response to different gesture inputs.

In some embodiments, a user may input touch and/or gestures with respect to a user interface element on a user interface. The display screen of a computing device can detect one or more input signals from the user. An operating system can recognize and identify touch and/or gesture events based on the input signals. The touch and/or gesture event may then be processed by the application. The application in some embodiments may determine an operation (also referred to as an action or a function) corresponding to the touch and/or gesture event to be performed. For example, JavaScript® can associate actions with different touch events, such that the application may determine that different types of input directed to a single user interface element may correspond to different operations or actions.

Some embodiments provide a single user interface element (also referred to as a single user interface control) that is capable of causing an application to perform different operations based on different touch and/or gesture inputs received by the single user interface element. The operation or function to be performed (e.g., an action function, a configuration function) can be differentiated based on the different types of gestures and/or the different magnitudes of the gestures received at the user interface element. For example, a small swipe directed at a user-selectable user interface item can cause the application to perform a scrolling function while a heavier stroke may cause the application to perform a menu hierarchy shifting function where different levels of the menu hierarchy can be presented.

Various embodiments will now be discussed in greater detail with reference to the accompanying figures, beginning with FIG. 1.

I. System Overview

FIG. 1 is a schematic block diagram illustrating an embodiment of a system 100 (also referred to as an apparatus 100 or an electronic device 100) that may be configured to provide a user interface element that enables multiple different operations to be performed. System 100 can be, for example, a desktop computer, a laptop computer, a tablet computer, a smartphone, a mobile phone, a media player, a game console, or any combination of computing devices. As shown in this example, system 100 in some embodiments can include a user interface 105, a gesture interpreter module 110, an action module 115, and storage 120.

Certain embodiments can provide an application that allows a user to manipulate characteristics and/or visual attributes of a user interface element according to different types of gestures performed by the user at another user interface element. As described, an application can provide one or more user interfaces, within which one or more user interface elements can be displayed. In some embodiments, user interface 105 can display one or more user interface elements 125 and 130 (also referred to as user-selectable items, user interface objects, or controls). One or more of these user interface elements may be selectable by a user or system 100 for performing one or more operations. For example, a button may be displayed that can be used by a user of system 100 to perform an operation associated with the button. For example, when user interface item 125 receives a particular gesture, an operation that causes a user interface element 130 (e.g., user interface item 130 that is a display panel) to be displayed on user interface 105 of electronic device 100 can be activated. When the operation is activated (i.e., user interface item 130 is being displayed), the application can further deactivate the operation (i.e., cause user interface item 130 to cease to be displayed) when another gesture is received at the same user interface element 125.

In some embodiments, a user interface element can be associated with one or more characteristics and/or visual attributes. Example of visual attributes of a user interface element may include, without limitation, a dimension (e.g., a width, a length), an animation effect, a color, a shape, a font, etc. Examples of associated characteristics can include the functionality of the user interface element. For example, a user interface element can be associated with an activation of a display screen and cause a display screen to be displayed when the user interface element is selected.

In some embodiments, characteristics or visual attributes of a user interface element displayed on the user interface can be configured when a gesture has been performed upon another user interface element being displayed on the user interface. For example, a dimension of a user interface element such as a display panel can be modified when another user interface element such as a button receives a particular gesture. In some embodiments, a same user interface element can be used to perform multiple operations.

While in some instances user interface item 125 can be displayed as a user-selectable button, user interface item 125 can be displayed differently (e.g., a handle, a toolbar, a hyperlink, selectable text, a selectable symbol) in different embodiments. In some embodiments, a corresponding operation (e.g., the display or hiding of a display panel) may be activated and deactivated (e.g., displayed or hidden) based upon a same type of gesture directed at the user interface item. In one example, receiving a single-tap gesture at a user interface item may cause a separate display panel to be displayed while receiving a same single-tap gesture at the same user interface item may cause the display panel to cease to be displayed. In another example, receiving a swipe gesture at a user interface item may cause a display panel to be displayed (sometimes with an animation effect where the display panel appears in the direction that the swipe gesture is effected) while receiving another swipe gesture at the user interface item may cause the display panel to be minimized. The swipe gestures in different directions may still be considered to be a same type of gesture while having different magnitudes (in direction or in weight).

In some instances, a user interface element 130 can be a display panel that includes one or more associated characteristics or visual attributes. The associated characteristics and/or visual attributes of user interface element 130 can be configured upon a gesture performed upon user interface element 125. For example, the dimensions, shape, size, font, manner of display, the types of user interface sub-elements, the location of the user interface sub-elements part of the display panel, and/or color can all be visual attributes of a display panel that can be configured upon receiving a gesture directed at a user interface element (e.g., user interface element 125).

In some embodiments, information related to one or more visual attributes of a user interface item such as user interface item 130 may be stored. For example, the information may be stored in storage 120, which can be a memory device. When the user interface item is to be displayed or rendered, information corresponding to the item stored in storage 120 may be retrieved and used to display the object. For example, if the user interface object is a panel, then information related to the size or dimensions (i.e., width and length) of the panel may be stored in storage 120. Upon receiving a command to display the display panel, an application may retrieve this stored information from storage 120 and use the information to display the panel. In this manner, until the stored dimensions information is changed, the panel is displayed each time with a uniform size.

Gesture interpreter 110 can be configured to receive gesture inputs and analyze the gesture inputs to identify a gesture that is performed by the user. A gesture interpreter in some embodiments can determine touch and/or gesture events based on the touch input signals. In certain embodiments, a gesture interpreter can be used to recognize touch input signals against one or more user interface elements and identify the corresponding touch and/or gesture event. The touch and/or gesture event may then be processed by the application.

Action determiner 115 can determine the action to be performed by mapping the gesture to the action or operation to be performed. In some embodiments, an action determiner may determine an operation (also referred to as action or function) that corresponds to the touch and/or gesture event in response to receiving the touch and/or gesture event. In one embodiment, the action determiner may determine that different types of touch input directed to a single user interface element may correspond to different operations or actions.

In one example, the user can direct a gesture at user interface item 125 displayed on user interface 105 of electronic device 100. In response to receiving the input corresponding to the user's gesture, gesture interpreter module 110 can identify the type of touch and/or gesture event. One of ordinary skill in the art would recognize that the determination of the type of touch and/or gesture event corresponding to the user input can be performed in many ways, e.g., by analyzing the distance of a drag movement along the screen. For example, a user input can be determined to be a drag-type gesture event if a distance of an uninterrupted drag-movement from a location of actuation of the user input on the touchscreen display is greater than a threshold distance. In some embodiments, gesture interpreter 110 can be part of the operating system while in one embodiment gesture interpreter 110 can be part of the application.

Upon determination of the type of touch and/or gesture event corresponding to the user input, action determiner module 115 can map the type of gesture event to an action (or operation) to be performed. For example, in some embodiments, a tap-type gesture directed at user interface item 125 can correspond to a tool-activation command/action where a user interface item 130 (e.g., a display panel) is caused to be displayed. A drag-type gesture (or any non-tap gesture) can correspond to a tool-adjustment or tool-configuration command/action where visual attributes of the display panel can be modified.

According to certain embodiments, different types of touch and/or gesture events applied to a single user interface item can be mapped to different commands, actions, or operations. In one embodiment, the commands (or operations) corresponding to the gesture events can be preconfigured by a system administrator. Some embodiments enable a user of electronic device 100 to configure different gesture events to correspond to different commands (or operations).

In some embodiments, action module 115 can access storage 120 to determine persistent attributes associated with a user interface item (e.g., user interface item 130). Persistence can refer to characteristic of state that outlives the process that created it. In one embodiment, persistent attributes associated with a user interface item can refer to one or more visual attributes of the user interface item, such as a dimension, a font, a color, a location of additional user interface items displayed within the user interface item, etc. Persistent attributes associated with a user interface item can also refer to other characteristics and properties associated with the user interface item, such as a functionality of the user interface item.

Information for the persistent attributes of user interface item 130 can be stored in storage 120 and remain accessible for a threshold period of time. As such, the information can be accessed when the user interface item is cause to be displayed or re-displayed. In some embodiments, the information for the persistent attribute can be stored as data in non-volatile storage such as a hard drive or flash memory or in volatile storage such as RAM. For example, during the execution of an application, the information may be persisted in the RAM, but need not be persisted between invocations of the application. As such, the persistent attribute (e.g., dimensions of a display panel) associated with a user interface item (e.g., the display panel) would still be retrievable and applicable after the associated user interface item has been caused to be hidden and re-displayed.

As described, action determiner module 115 can determine the action to be performed based on a gesture directed at a user interface item. In some embodiments, the action may be a displaying or a hiding of another user interface item such as a display panel. When the other user interface item is cause to be displayed, the persistent attributes associated with the other user interface item can be determined. For instance, the persistent attributes associated with the other user interface item may be its dimensions. The information 135 for the persistent attributes (e.g., stored in storage 120) can be retrieved and used to display the particular visual attribute of the user interface item (i.e., the dimensions of the display panel 135). As the persistent attribute is modified (e.g., by user adjustment), information 135 for the persistent attribute may be updated in storage 120. As such, the next time that the user interface item is caused to be displayed, the last-stored configured information 135 for the persistent attribute may be retrieved and used to display the user interface item.

In certain embodiments, based on the user interface object and the type of gesture performed upon the user interface item (e.g., user interface item 125), action module 115 can determine whether persistent attributes (e.g., persistent attributes 135) associated with the user interface item exist and apply the persistent attributes to the user interface item. For example, action module 115 can determine that persistent information (e.g., dimensions) may exist for a tap-type gesture event directed at user interface item 125 and retrieve the persistent information from storage 120. As such, upon identifying a tap gesture event that corresponds to a command for causing a display panel to be displayed, action module 115 may determine that persisted information 135 such as the dimensions of the display panel exists and retrieve the dimensions from storage 120. The display panel may then be displayed with the dimensions retrieved from storage 120.

Furthermore, another type of touch and/or gesture event may cause the persisted information associated with the user interface object to be updated in storage 120. For example, action module 115 can cause persisted information 135 associated with user interface item 130 to be updated when action module 115 determines that the received user input corresponds to a drag-type gesture event. Upon identifying a drag gesture that corresponds to a command for modifying dimensions of a display panel, action module 115 may determine that persisted information with respect to the dimensions of the display panel can be updated based on the drag gesture event and stored in storage 120.

II. Flow Overview and Graphical Representation

Some embodiments provide a single user interface item that responds to one gesture as a conventional control and responds to another gesture for configuring the control. In some embodiments, an application can recognize different user gestures directed at the single user interface item and perform different functions called for in response to the gestures. FIG. 2 is a flow diagram of illustrative process 200 of some embodiments for displaying and modifying another user interface item in response to different gestures directed at a single user interface item.

Process 200 can be performed by a single device (e.g., device 100 in FIG. 1, a server device) or any suitable combination of devices. Process 200 will be described by reference to FIGS. 3A-3C, which illustrate an example sequence of screen images of GUI 300 for an electronic device 305 in configuring a visual attribute of a user interface item. GUI 300 can include a main panel 310 (here, referred to as interface object for ease of distinguishing) for displaying an image currently being edited and a tools panel 315 for displaying a set of editing tools, and a user interface item 320 for causing the application to perform different operations based on different gestures received at user interface item 320.

At block 205 of FIG. 2, process 200 can display a user-selectable item (e.g., user interface item 320). In some embodiments, the user-selectable item can be displayed on a GUI that is part of a software application (e.g., an e-mail application, a messaging application, a presentation application, an image editing application, etc.). In certain embodiments, the user-selectable item can be displayed by an application or by an operating system. In one instance, the user-selectable item can be displayed on a desktop or in a window that is not generated by a software application providing a service such as an e-mail service or a Web browsing service, but generated by the operating system (e.g., as a plug-in), a display panel for displaying a series of images.

Figure 3A:
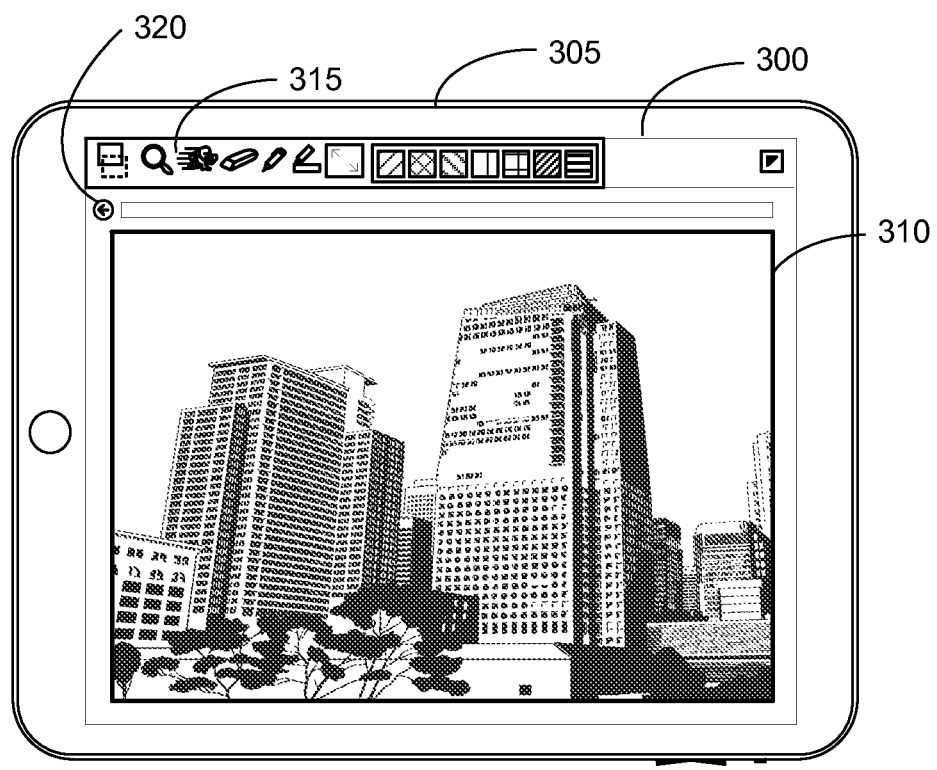
FIGS. 3A-3C illustrate an example sequence of screen images of a graphical user interface (GUI) for an electronic device in configuring a visual attribute of a user interface object according to some embodiments.
Figure 3B:
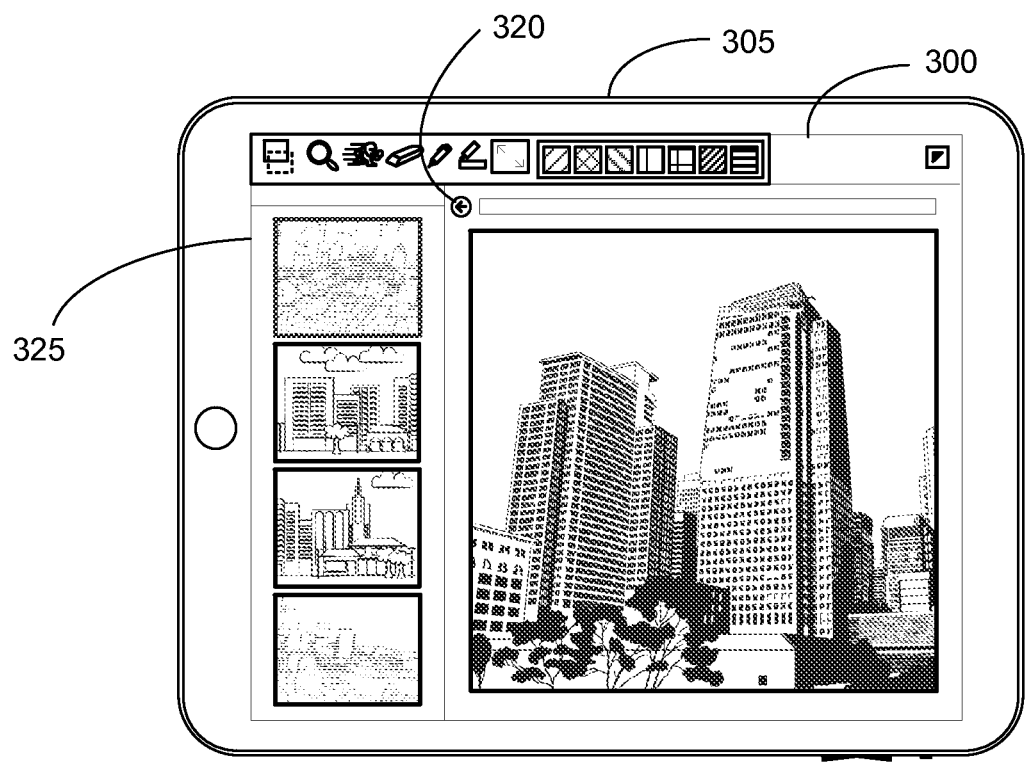
Figure 3C:
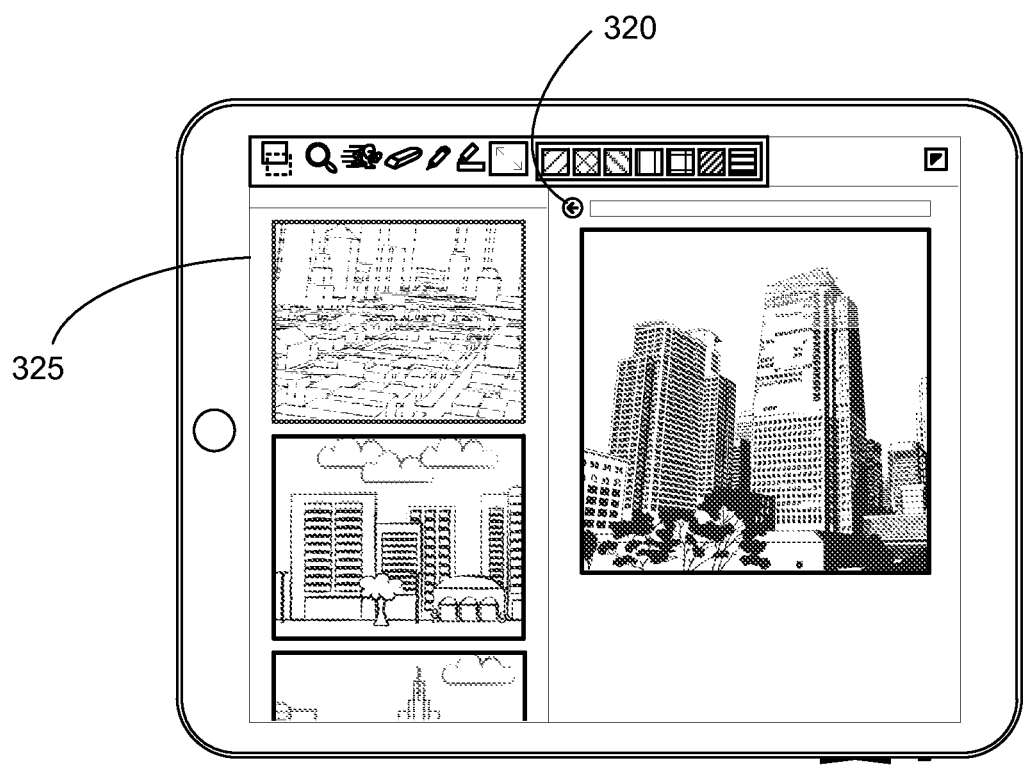

As described, FIGS. 3A-3C illustrate a user-selectable item that enables a user to cause a display panel to be displayed and to cause a visual attribute of the display panel to be configured in response to receiving different types of gesture input. FIG. 3A illustrates GUI 300 of an image editing application for displaying a user-selectable item 320 operable to cause the application to perform multiple functions based on a gesture input. Different embodiments may display user-selectable item 320 differently. In one example, some embodiments may display user-selectable item 320 in a different location within GUI 300. In another example, some embodiments may display user-selectable item 320 using different and potentially more intuitive graphic representations (e.g., a user interface item with a handle attached to it indicating that there may be multiple functionalities associated with the user interface item).

Returning to FIG. 2 at block 210, process 200 can receive a gesture directed to the user-selectable item. In some embodiments, the application can receive a user input directed to the user-selectable item where the user input corresponds to a particular touch and/or gesture event. That is, a gesture interpreter (e.g., gesture interpreter 110) can translate a gesture directed at the user-selectable item to a gesture event. As described, the application can receive a multi-touch gestures directed at different user-selectable items displayed by the application. The application can interpret the touches a user makes as a particular touch and/or gesture event and identify a command associated with the particular touch and/or gesture event. For example, in FIG. 3A, a user can perform a gesture directed to user-selectable item 320. In this example, the operating system may interpret the touches made by the user as a tap gesture.

At block 215, process 200 can display a user interface object alongside the user-selectable item at which the gesture was directed. In some embodiments, the other user interface object can be a display panel. In response to receiving a gesture directed at the user-selectable item, an application in some embodiments can determine an operation corresponding to the gesture. As described in FIG. 1, upon receiving a user input at user interface 105 in FIG. 1, gesture interpreter 110 can determine a touch and/or gesture event corresponding to the user input. Action module 115 in FIG. 1 can then determine an action or command corresponding to the gesture (e.g., via a lookup table). In this example, the command or action corresponding to a tap gesture can be to display a display panel.

In FIG. 3B, responsive to a tap gesture directed at user-selectable item 320, a display panel 325 associated with the user-selectable item 340 can be displayed. Display panel 325 has a length and a width (that is greater than zero) and can display a series of images (e.g., stored locally on the user's device 305, stored on a network drive accessible via a network). In this example, in response to receiving a user input at user-selectable item 320 where the user input corresponds to a tap gesture, the application displays display panel 325. While in this example, the user interface object is a display panel, this is not intended to be limiting. The displayed objects may be different in different applications or context and may be objects such as a meter control (e.g., a volume control) and the like that can have one or more configurable visual attributes or characteristics.

Further, instead of a series of images, the display panel in some embodiments can display a list of emails, a list of contacts, a list of documents, a list of songs, etc. The display panel may display a number of items or objects based on the type of application that is being used. For example, an address book application or social networking application may display a list of contacts in the display panel when the display panel is activated and caused to be displayed.

Returning to FIG. 2, at block 220, process 200 can receive another gesture directed to the user-selectable item that causes a state of the user-selectable item to be changed from a first state to a second state. In some embodiments, an application can receive another user input directed to the user-selectable item and identify a touch and/or gesture event corresponding to the user input. As described, the touch and/or gesture event corresponding to the user input can be identified by gesture interpreter 110 in FIG. 1. Action module 115 (also referred to as action determiner) can then determine an action, an operation, or a command corresponding to the gesture. For example, gesture interpreter 110 can identify the user input that causes a state of the user-selectable item to be changed from a first state to a second state to be a drag gesture. Action determiner 120 can determine that the drag gesture corresponds to an adjustment of a parameter or characteristic of the user interface object in some embodiments.

As described, a second gesture directed to the user-selectable item can be received that causes a state of the user-selectable item change. In one embodiment, the state of the user-selectable item can be changed from a first state (as shown in FIG. 3B) to a second state (as shown in FIG. 3C) when the user-selectable item is moved from a first position (in FIG. 3B) to a second position (in FIG. 3C). In this example, the change in state of user-selectable item 320 has been caused by the user dragging item 320 from the first position to the second position using a drag gesture directed at user-selectable item 320.

At block 225, a visual attribute of the user interface object is modified based on the second state of the user-selectable item. An application can modify the visual attribute of the user interface object in response to the other gesture that caused a state of the user-selectable item to be changed from a first state to a second state. In one example, the visual attribute of the user interface object can be a dimension of the user interface object (as shown in FIG. 3C). In other examples, a modified visual attribute of the user interface object can be a hue, a size, a shape, or any other visually displayed characteristic of the user interface object.

In FIG. 3C, a dimension, namely, the width, of display panel has been modified based on an extent to which user-selectable item 320 was dragged. The width of display panel 325 has been modified based upon the second position of user-selectable item 340. In some embodiments, the list of items displayed in display panel may also be modified based on the modification of display panel. For example, the size of each item (e.g., each thumbnail) in the list of items (e.g., group of thumbnails) displayed in panel 325 may increase in size proportionately to the increase in the width of display panel 325, as shown in FIG. 3C.

In some embodiments, the application may cause a continuous response in response to a continuous gesture on the part of the user directed at the control (e.g., user-selectable item 320). For example, the list of items can be resized in a continuous manner in response to the continuous gesture of dragging. As user-selectable item 320 is continuously dragged in a direction such that the width of display panel 325 is being modified in real-time, the list of items (e.g., the thumbnails) may be continuously resized in real-time. The application need not wait until the control is done being dragged by the user to respond with the resizing of the thumbnails. This enables the user to immediately understand the effect (e.g., the change in dimensions or settings of a display panel) that can be derived from the user's gesture directed at the control.

While in this example, a horizontal displacement of the user-selectable element can cause a visual attribute (i.e., a width) of the display panel to change, other types of displacement of the user-selectable element may cause other visual attributes of the display panel to change. For example, a vertical displacement of the user-selectable element may cause the color of the display panel to change. That is, moving the user-selectable element up or down from a first location in the user interface to another location in the user interface may cause a background color of the display panel to change from white to light blue.

Other visual attribute or characteristics may be modified as well. For example, the location of sub-elements within the display panel (e.g., listings of contacts, items, etc., icons, tiles, content) can be customized, configured, sorted, or moved-around when the display panel is displayed. When the display panel is caused to be hidden and re-displayed, the persistent attributes such as the location of the sub-elements may be maintained. That is, the information indicating the locations or relative locations of the persistent attributes may be retrieved from storage and used in displaying the sub-elements.

While interacting with a user-selectable item in this instance enabled the display of a display panel and the adjustment of the display panel, some embodiments allow the user to modify different visual attributes of a display panel (or other type of user interface element) in response to different gestures directed at the user-selectable item. For instance, a user-selectable button can be associated with a display panel whereupon a color of the display panel can be modified upon receiving a first gesture at the button (e.g., a swipe motion, or a swipe motion with a magnitude and/or direction) and a brightness of the display panel can be modified upon receiving a second type gesture (e.g., a drag motion, or a steady and slower movement in a particular direction) at the button. Further, some embodiments may permit the display panel to be displayed or hidden when the associated button receives a tap gesture.

Some or all of process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

III. Maintaining Persistent Characteristics of a User Interface Object

In some embodiments, a change in a visual attribute of a user interface object can be persisted. In response to receiving a gesture that causes a state change of a user-selectable item, an application can store a modification of the visual attributes of the user interface object. In one example, upon configuring a length (or a width) of a display panel by adjusting a user-selectable item, an application can store the configured length (or width) of the display panel in memory (e.g., storage 120 in FIG. 1).

FIG. 4 is a flow diagram of illustrative process 400 of some embodiments for displaying a user interface object according to its persisted characteristics. FIG. 4 can be implemented by an electronic device (e.g., client device 100 in FIG. 1). FIG. 4 will be described with reference to FIGS. 5A-5F, which illustrate an example sequence of screen images of GUI 500 for maintaining a last configuration of a visual attribute or characteristic of a user interface object.

Figure 5A:
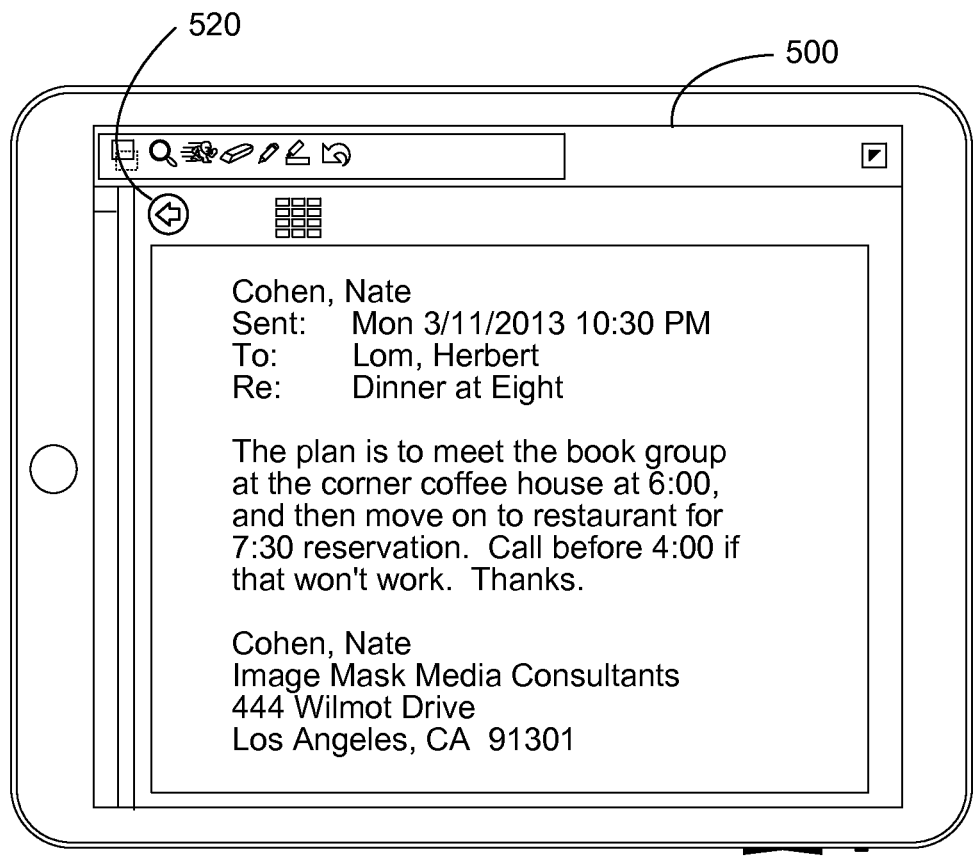
FIGS. 5A-5F illustrate an example sequence of screen images of a GUI for maintaining a last configuration of a visual attribute or characteristic of a user interface object according to some embodiments.

At block 405, process 400 can display a user-selectable item (also referred to as a user interface element). In some embodiments, the user-selectable item may be a button displayed on a touchscreen display that can be selectable by a user, e.g., via a finger. The user-selectable item can be displayed as part of a GUI of an application running on the electronic device or part of a GUI generated by the operating system. As shown in FIG. 5A, user-selectable item 520 can be displayed in GUI 500 of an e-mail application. Different embodiments may display the user-selectable item differently. For instance, the user-selectable item may be selectable text or content instead of a selectable button.

Figure 5B:
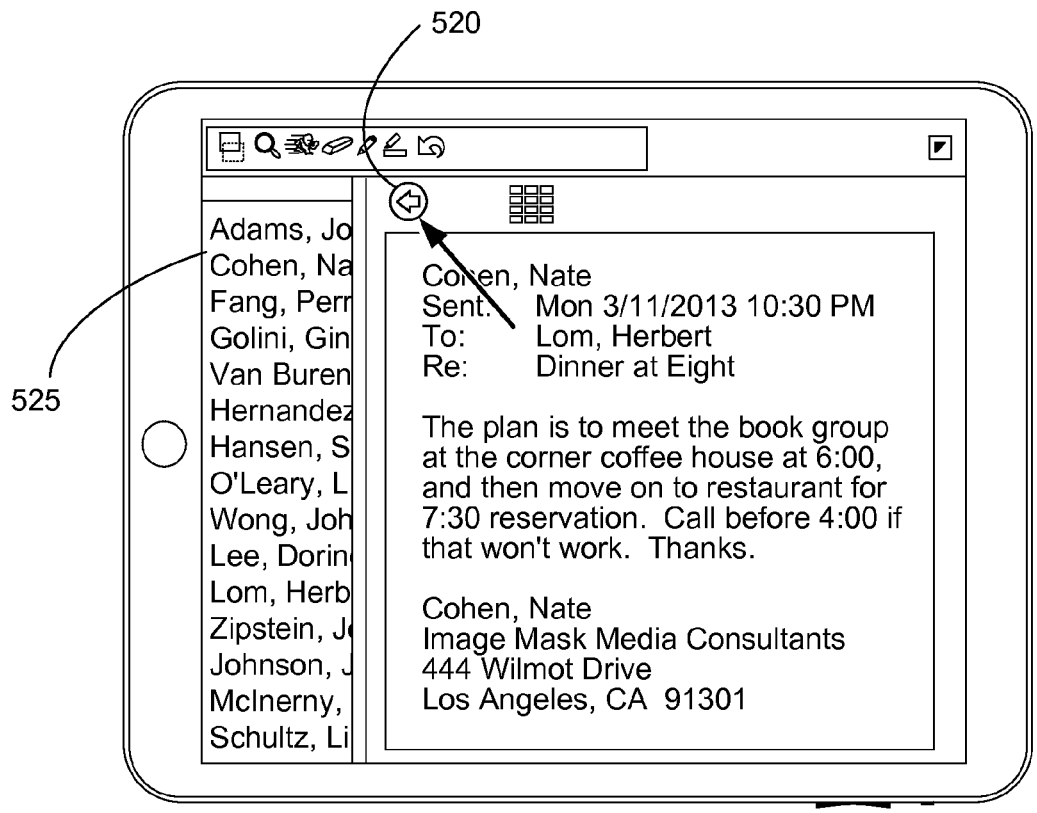

At block 410, process 400 can receive a first user input directed to the user-selectable item. The first user input can correspond to a first touch and/or gesture event. In some embodiments, in response to receiving the user input directed to the user-selectable item, a gesture interpreter (e.g., gesture interpreter 110 in FIG. 1) can identify the particular touch and/or gesture event corresponding to the received user input (also referred to as a gesture). As shown in FIG. 5B, a display panel 525 including a list of contact is displayed in response to the user input directed to the user-selectable item 520. In this example, a gesture interpreter has identified the user input to correspond to a tap gesture event. The action determiner has determined that a tap gesture event directed at user-selectable item 520 can be mapped to the action of displaying display panel 525.

In some embodiments, upon determining that the corresponding action is to display a display panel, the application may determine a set of characteristics or attributes associated with the display panel. In certain embodiments, the characteristics or attributes associated with the display panel can be persistent. That is, the characteristics or attributes from a previous session can be stored for subsequent retrieval and usage. When the display panel is caused to be displayed, the previous characteristics or attributes associated with the display panel can be retrieved from a storage device and applied to the display panel such that the display panel is displayed in a manner similar or the same as the last time that the display panel was displayed—with the same characteristics or visual attributes.

In one embodiment, the display panel may be associated with a default display setting, which includes default dimensions for the display panel. In certain embodiments, the application may determine the set of characteristics or attributes by accessing a storage device (e.g., storage 120 in FIG. 1) and determining persistent attributes associated with the dimensions of the display. As such, the display panel may be displayed with the persistent attributes determined for the display panel. The application may be prompted to access the storage device in response to detecting a particular gesture performed upon a particular user interface element in some embodiments.

At block 415, process 400 can cause a display panel associated with the user-selectable item to be displayed. In response to receiving a gesture input corresponding to an action that includes causing a display panel to be displayed, the application causes the display panel to be displayed. In some embodiments, different gesture inputs may correspond to other types of actions, operations, or commands. Instead of displaying a display panel, the application may perform those actions or commands in response to receiving the user input corresponding to those actions or commands. For instance, a first type of user input may correspond to displaying a tool (or a control or any user interface object) while another type of user input may correspond to configuring or modifying characteristics (or attributes) of the displayed object. As shown in FIG. 5B, display panel 525 is presented by the application in response to a user input corresponding to a tap gesture.

Figure 5C:
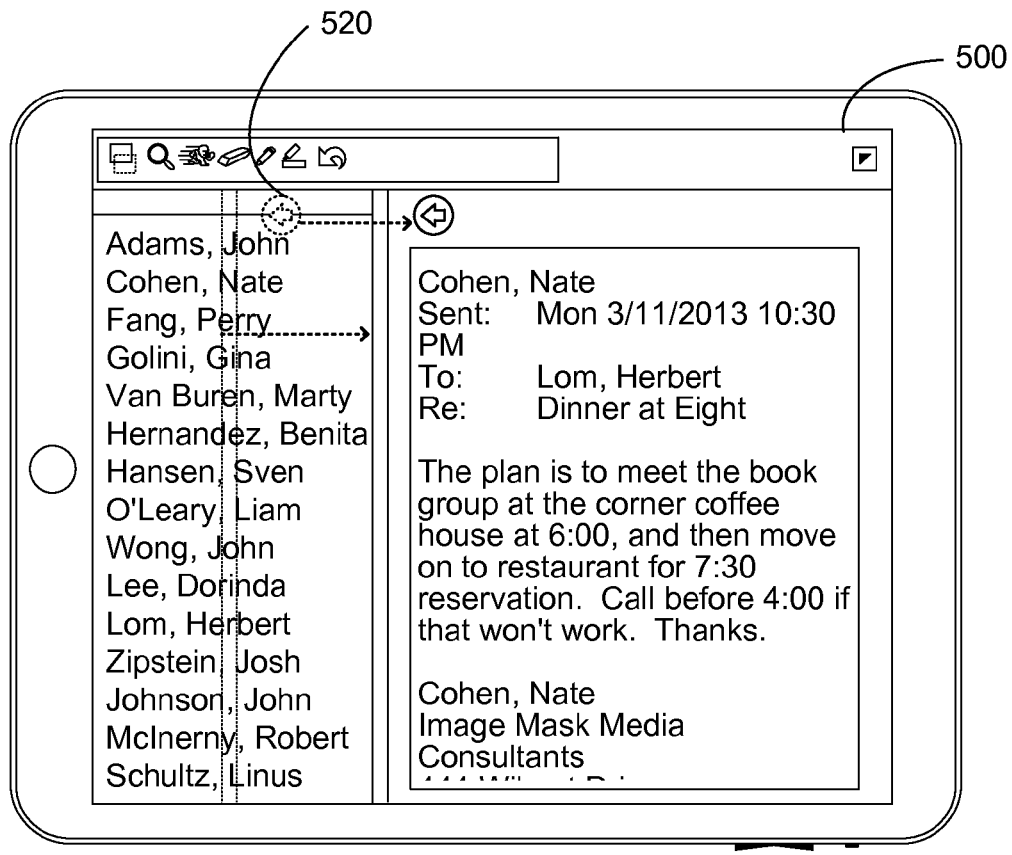

At block 420, process 400 can receive another user input directed to the user-selectable item. The other user input can correspond to another gesture event and can cause a state of the user-selectable item to be changed from a first state to a second state. In some embodiments, the other user input can correspond to a drag or a tap-drag motion/gesture and cause the user-selectable item to have a horizontal displacement across the user interface. As shown in FIG. 5C, the other user input directed to user-selectable item 520 is a dragging motion that causes user-selectable item 520 to be moved from a first location (as shown with dotted lines) to a second location (as shown with solid lines) on user interface 500. As shown in this example, the width of display panel 525 increases as user-selectable item 520 is dragged to the right.

Figure 5D:
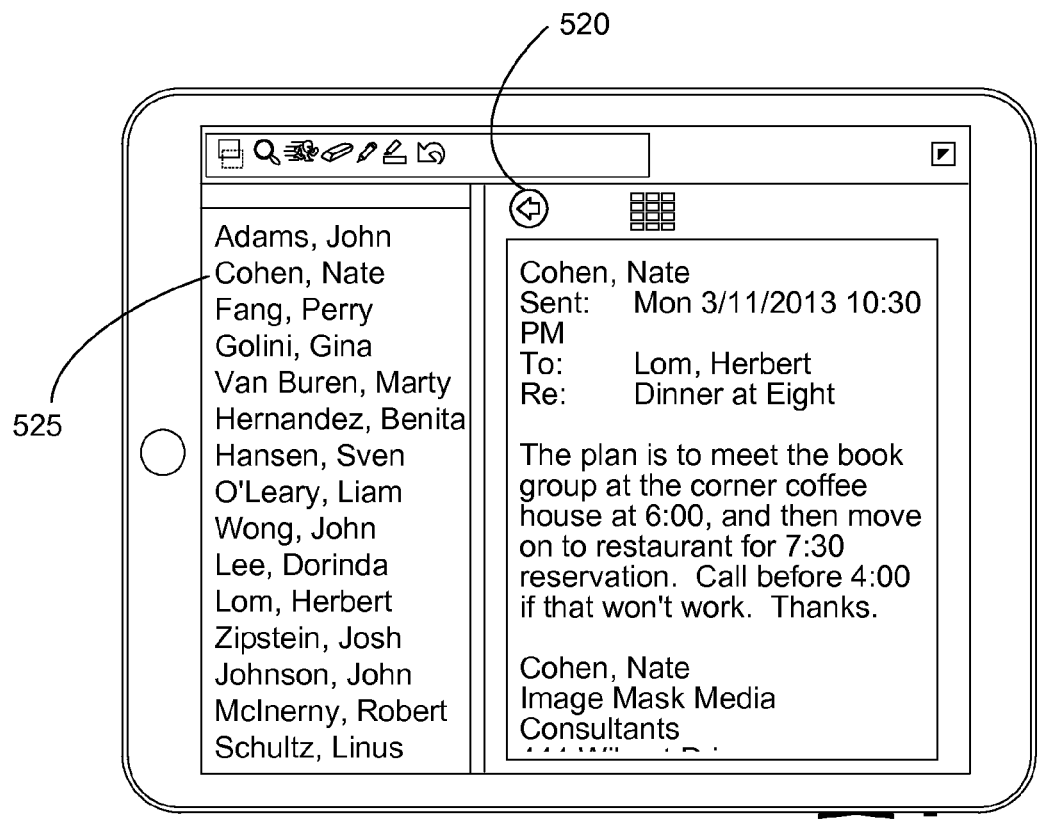

At block 425, process 400 can modify at least one dimension of the display panel based on the second state of the user-selectable item. At least a length of a width of the display panel can be modified as the user-selectable item is dragged along the display screen. As shown in FIG. 5D, the width of display panel 525 has been expanded. The act of dragging user-selectable item 520 to the right corresponds to an extension of the right hand border of display panel 525. In response to receiving user input corresponding to different gestures at the user-selectable item, the application performs different actions. As shown in FIGS. 5B and 5C, the right-hand border of display panel 525 is adjusted proportionately as user-selectable item 520 is dragged to the right. The increase in the width is stopped when user-selectable item 520 is no longer being dragged to the right.

While in some embodiments the items displayed in the display panel may increase in size as the display panel increases in size (e.g., in a proportionate manner), some embodiments maintain the size of the items displayed in the display panel. As shown in FIG. 5C, the font size of the contacts is maintained. As the display panel increases in width, more of the content (i.e., more of the text of each contact) can become visible to the user. As such, by adjusting the width of the display panel, the user is able to see the entire name for all of the contacts in the contacts list displayed in display panel 525.

At block 430, process 400 can store the information related to the modified dimension of the display panel. In some embodiments, the information related to the modified dimension of the display panel can be a value of the adjusted width. The information can be stored in storage (e.g., storage 120 in FIG. 1) and retrieved at a later time when the display panel is being re-displayed. Some embodiments store the information related to a visual attribute of the display panel because the visual attribute is a persistent attribute. In some embodiments, a determination is made as to whether the visual attribute being modified is a persistent attribute of the display panel (or user interface object) prior to storing the information related to the modified visual attribute.

At block 435, process 400 can receive a user input directed to the user-selectable item where the user input corresponds to the first gesture event. The user input corresponding to the first gesture event where the first gesture event is a tap gesture is a gesture for opening and closing the display panel. In some embodiments, the tap gesture can correspond to an action of turning on or off a display of a user interface object or activating or deactivating another user interface object.

Figure 5E:
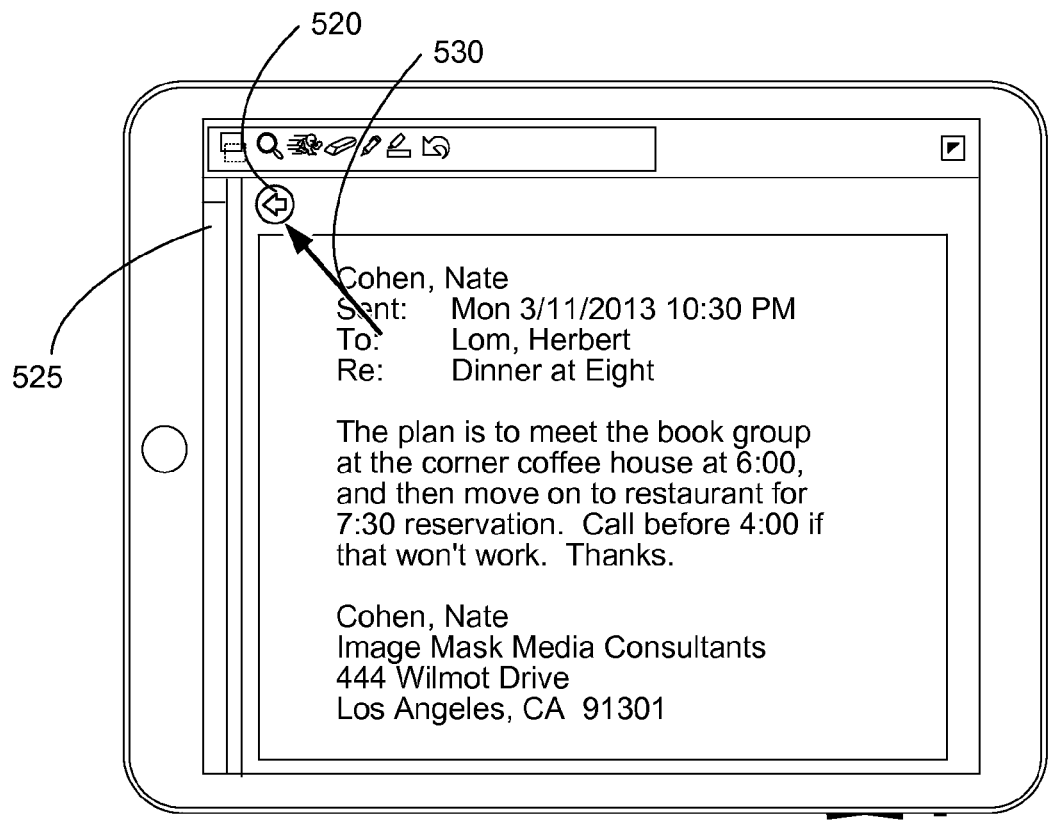

At block 440, process 400 can cause the display panel to no longer be displayed in response to the received user input. As shown in FIG. 5E, in response to receiving the user input corresponding to the tap gesture at user-selectable item 520, the application can cause the display panel to no longer be displayed. Some embodiments may present a minimized version of the display panel (e.g., a thin border without displaying any of the contents on display panel) when the "display the display panel" operation is deactivated.

At block 445, process 400 can receive another user input directed to the user-selectable item where the other user input corresponds to the first gesture event. In some embodiments, the user re-activates the display of the user interface object by performing a particular gesture at the user-selectable item. As indicated by an arrow 530 in FIG. 5E, a user can input a gesture at user-selectable item 520 to cause the application to perform one or more operations. In response to receiving the tap gesture directed at user-selectable item 520, the application can determine to activate the display panel (i.e., display the display panel) since the display panel is currently in a deactivated state. That is, if the display panel is in a closed state, the selection of user-selectable item 520 (e.g., via a tap) can cause the display panel to open such that the size of the display panel is not zero.

At block 450, process 400 can determine the dimensions of the display panel based on one or more persisted characteristics of the display panel. As described, one or more characteristics or visual attributes of a user interface object may be persistent. Some embodiments store the most recent information on the persistent characteristics or visual attributes of the user interface object (e.g., persistent attribute 135 in FIG. 1) in a storage device (e.g., storage 120 in FIG. 1). When the user interface object is activated or caused to be displayed, the application can retrieve the information of the persisted attributes (e.g., values of the dimensions of the display panel) from the storage device (e.g., stored in block 430 in FIG. 4) and use the information in displaying those attributes of the user interface object.

In some embodiments, the values or information associated with the persistent attribute may be stored in the storage device when a particular command has been received. For example, in response to receiving the drag gesture where the dimensions of the display panel has been altered, the application may update the stored data for the persistent attribute, that is, the dimensions of the display panel. As such, in this example, process 400 can update stored information pertaining to the dimensions of the display panel to include the modified dimensions, such as that shown in block 430.

At block 455, process 400 can cause the display panel to be displayed using the dimensions determined from block 450. In response to receiving the user input corresponding to a tap gesture, the application causes the display panel to be displayed. The application (e.g., action module 115 in FIG. 1) may determine that dimensions of the display panel is a persisted characteristic and retrieve the dimensions (e.g., persisted characteristic 135 in FIG. 1) from storage (e.g., storage 120 in FIG. 1). The application may then display the display panel using the stored dimensions.

Figure 5F:
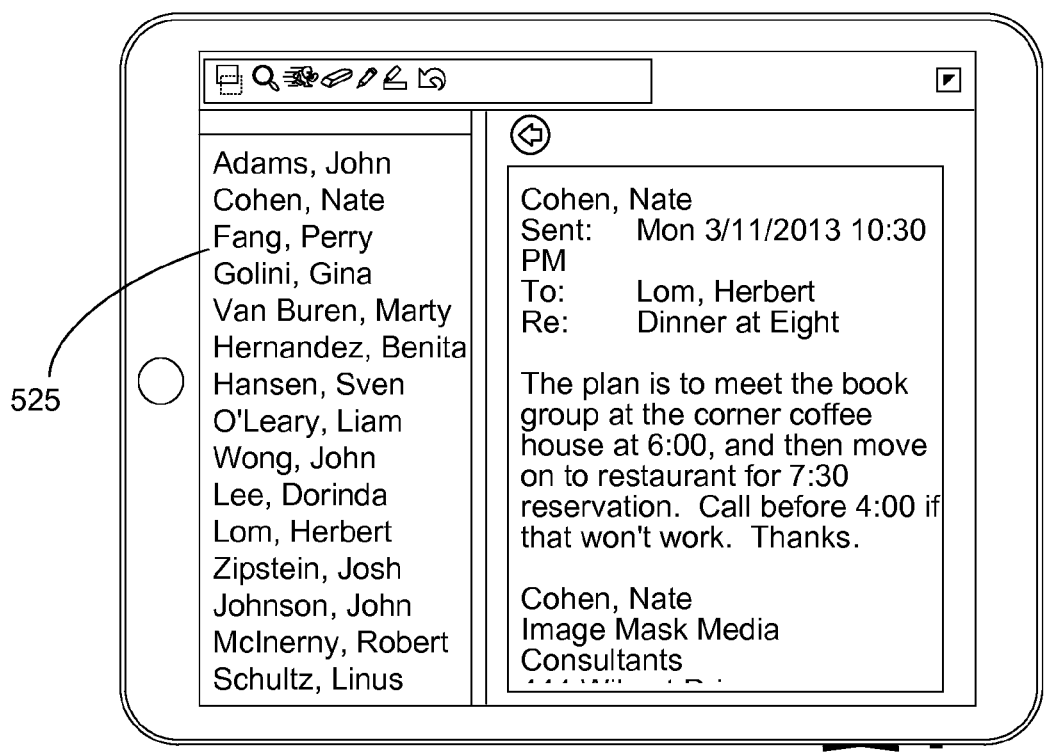

As shown in FIG. 5F, display panel 525 has the same dimensions as the dimensions from the last time it was adjusted (e.g., in FIG. 5C). The application can re-display the display panel with its persisted characteristics in response to receiving the user request (e.g., via a tap gesture) to display the display panel. As described, the tap gesture in this example corresponds to an activation or deactivation (i.e., display or not display) of the feature for displaying the display panel. Since the display panel is not currently being displayed, the tap gesture corresponds to a re-display of the display panel. The re-display of the display panel in its persisted characteristics (i.e., persisted dimensions) allows the user to view all the names it their entirety without having to readjust the width of the display panel again. The visual attributes of the display panel (and perhaps other features or tools in the application) can be tailored to the user's taste and preferences without requiring the user to re-input the desired view.

In various embodiments, instead of causing a display panel to open or close upon receiving a tap gesture, the application may cause the display panel to cycle through multiple states (e.g., three or more states/modes) including closed, slightly-open, and more-open/open, upon receiving a gesture (e.g., a tap gesture) directed at the control (e.g., a button). Further, in some embodiments, a second gesture (e.g., a drag gesture) can configure the first gesture's action dependent on the state of the user interface element (e.g., display panel) as determined from application of the first gesture (e.g., a tap gesture). In the instance when the display panel is in the slightly-open state, dragging the control button can set the size of the slightly opened display panel. Dragging the control button when the display panel is in a more-open/open state can set the size of the more-opened/open display panel. Another type of user interface element other than a display panel can be used in some embodiments.

Some embodiments may alter characteristics (e.g., a color, a size) other than a dimension or size associated with the user interface element (e.g., the display panel) upon receiving the second gesture (e.g., the drag gesture). Furthermore, certain embodiments may perform different functions against the user interface element depending on a current state of the user interface element (during which the gesture is being applied). For instance, when the display panel is in a fully-opened state, a drag gesture directed at the control button may alter the dimensions of the display panel whereas when the display panel is in a partially-opened state, a drag gesture may simply change a color (or other characteristic) of the display panel.

IV. A Single Control can Perform Multiple Configuration Operations Based on a Received Gesture Some embodiments can combine multiple controls into a single control such that the single control can cause an application to perform various operations based on a received gesture. In some embodiments, instead of adjusting a dimension of a user interface object, a user can perform different gestures on a user-selectable item to configure multiple attributes or characteristics of a user interface object associated with the user-selectable item. For example, in some embodiments, performing different gestures on a single word can enable an adjustment in a font, a color, a shape, or other visual attributes/characteristics of the single word.

FIGS. 6A-6G illustrate another example sequence of screen images of a GUI for combining multiple controls into a single user interface control in accordance with some embodiments. In some embodiments, user interface objects displayed on the user interface can cause different functions to be performed depending on the type of input received. In this example, the font of individual words can be activated for editing and modified based on different gestures directed at a single user interface element (also referred to as a user-selectable item or a user interface control). The single user interface element can be a button in some embodiments. In some embodiments, the individual words can each be a control that can be activated for editing.

Figure 6A:
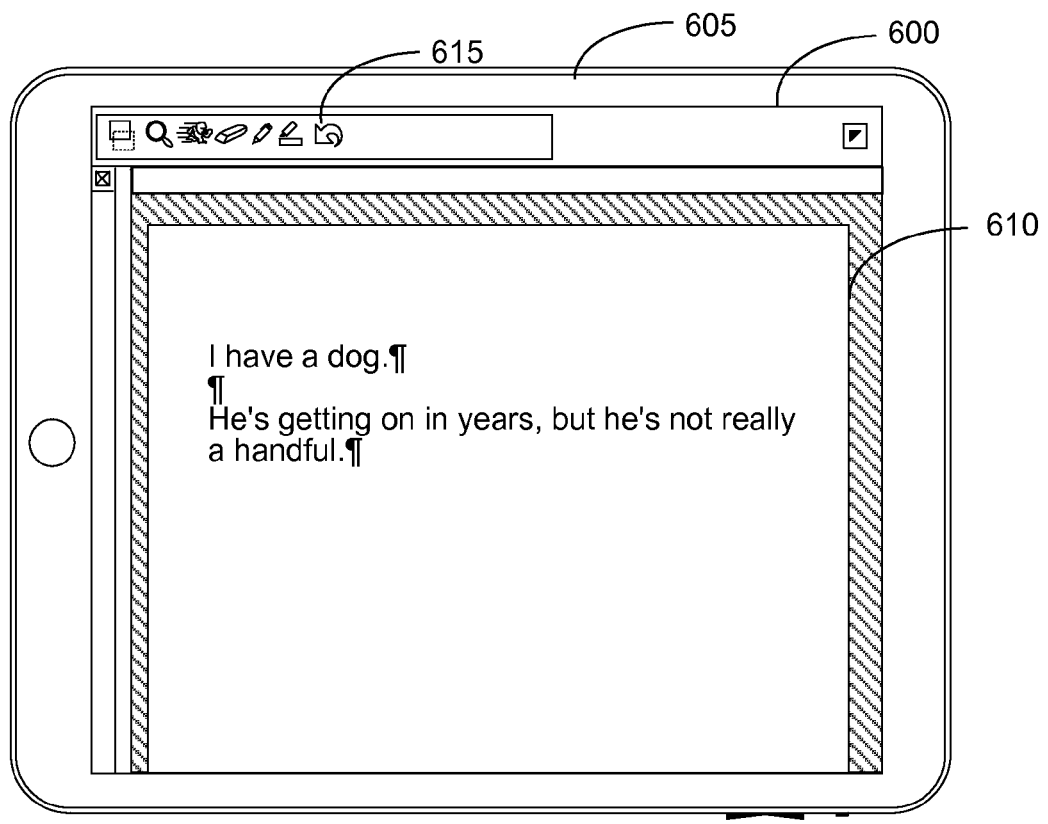
FIGS. 6A-6G illustrate another example sequence of screen images of a GUI for combining multiple controls into a single user interface control in accordance with some embodiments.
Figure 6B:
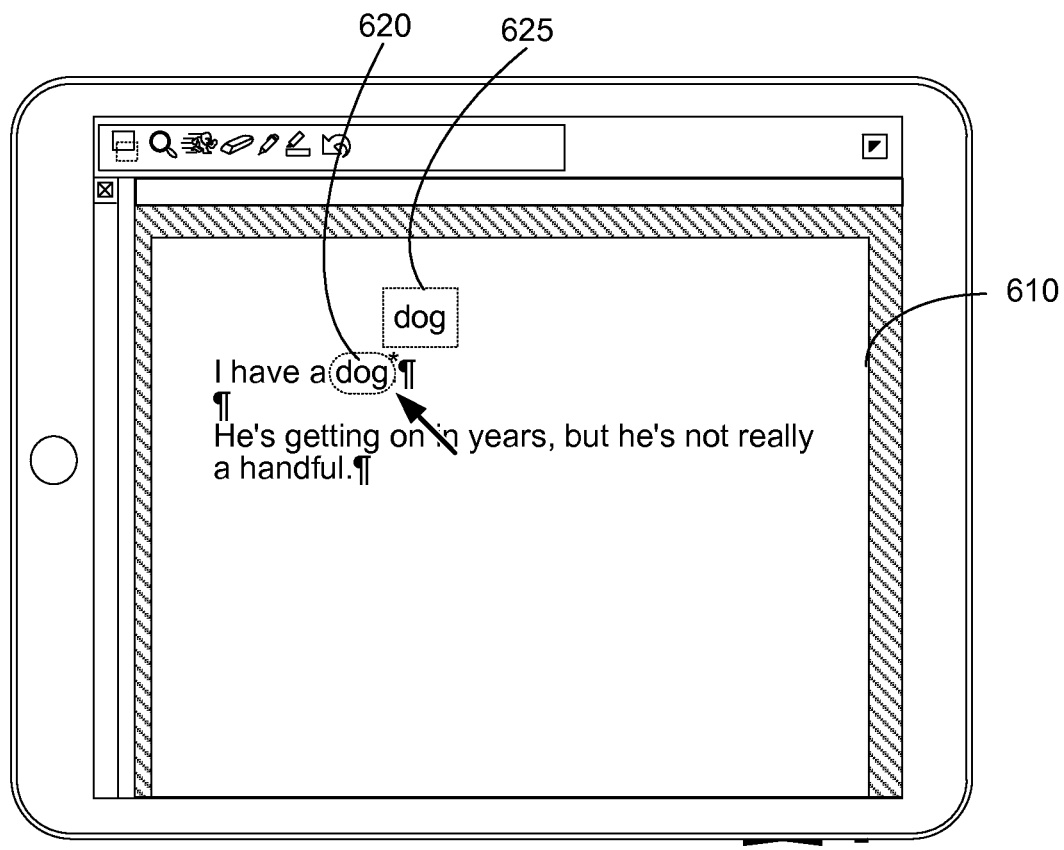

FIG. 6A shows a GUI 600 of a word processing application displayed on a computing device 605 where the user can compose and edit material. The word processing application includes a display area 610 for text composition and a tool box 615 for editing material. As shown in FIG. 6B, in response to a selection of a user interface element 620 in display area 610, the word processing application can display a representation indicating that the word is in edit mode. In this example, the application displays dotted lines around user interface element 620 (and an asterisk symbol) and a user interface object 625 to indicate that the word dog is now being edited. Different embodiments may display the activation of the edit-word mode differently.

While in this example the user interface element is the text, some embodiments may present a user-selectable button (or object or symbol) adjacent to each word (or editable-text). Upon receiving a gesture directed to the user-selectable button adjacent to a word or editable-text, the application in some embodiments may determine that the user desires to edit the corresponding word or text. In some embodiments, the selection of the user interface element can be a double tap on the touchscreen display. The application can interpret the double tap gesture to correspond to an edit-word command.

Figure 6C:
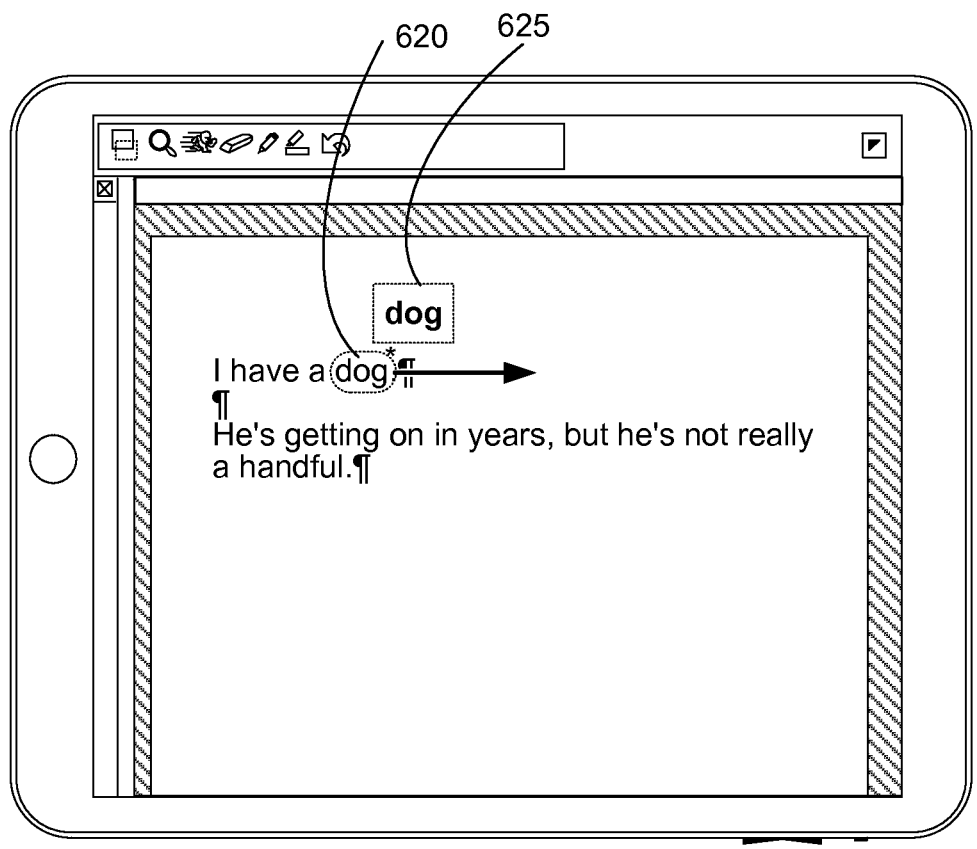

FIGS. 6C-6F illustrate examples of different gestures directed at the user interface object that cause different actions to be performed. In FIG. 6C, a user input directed at the user interface element 620 is received. The user input in this example corresponds to a swipe-right gesture. In response to receiving the user input, the application can cause the word to be bolded. The commands or actions corresponding to each gesture can be preconfigured by a system administrator in some embodiments. In some embodiments, the user can preconfigure the commands corresponding to the gestures e.g., in a preferences setting.

Figure 6D:
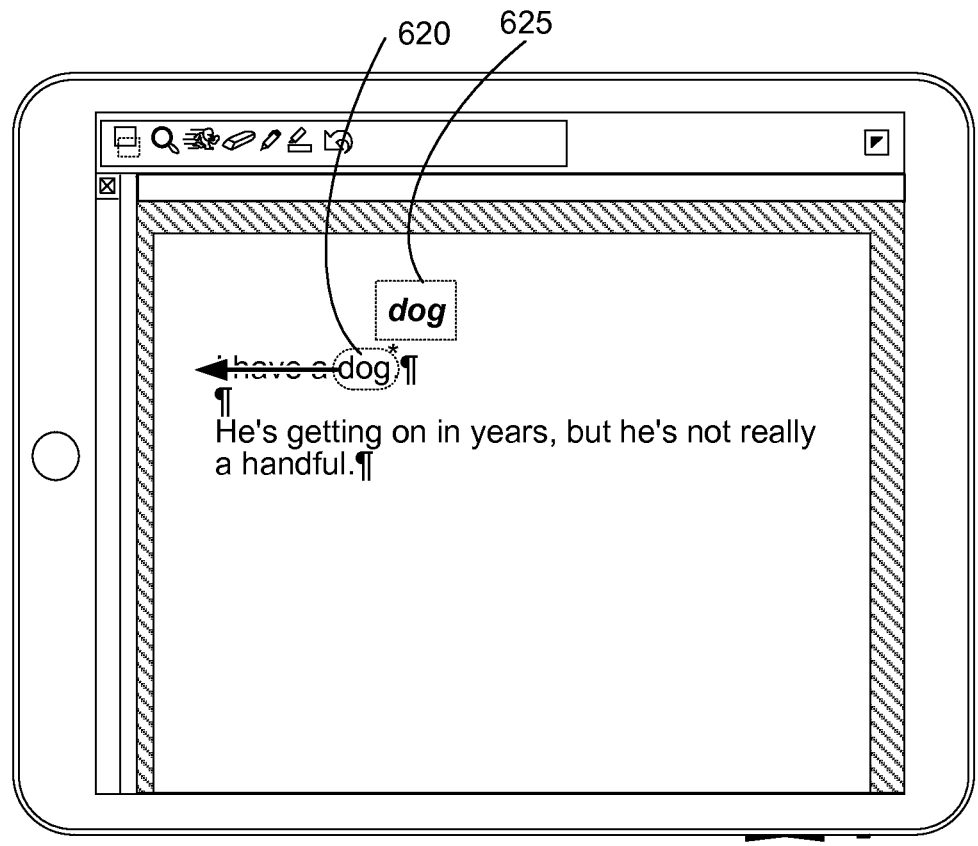
Figure 6E:
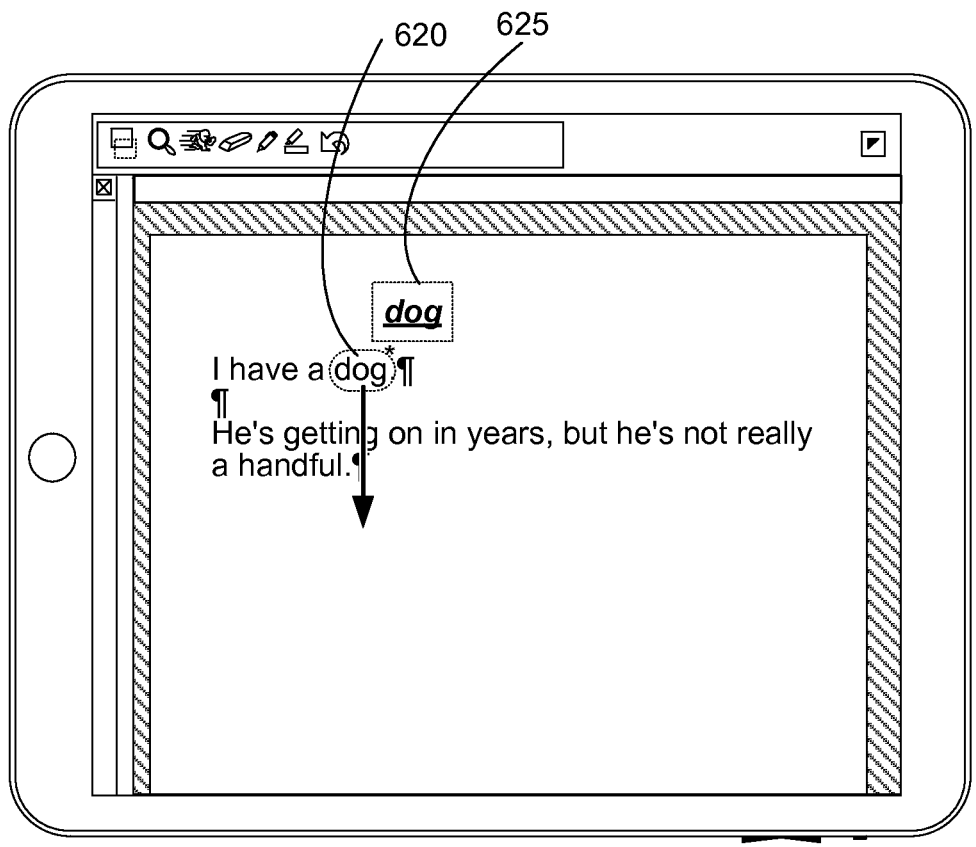
Figure 6F:
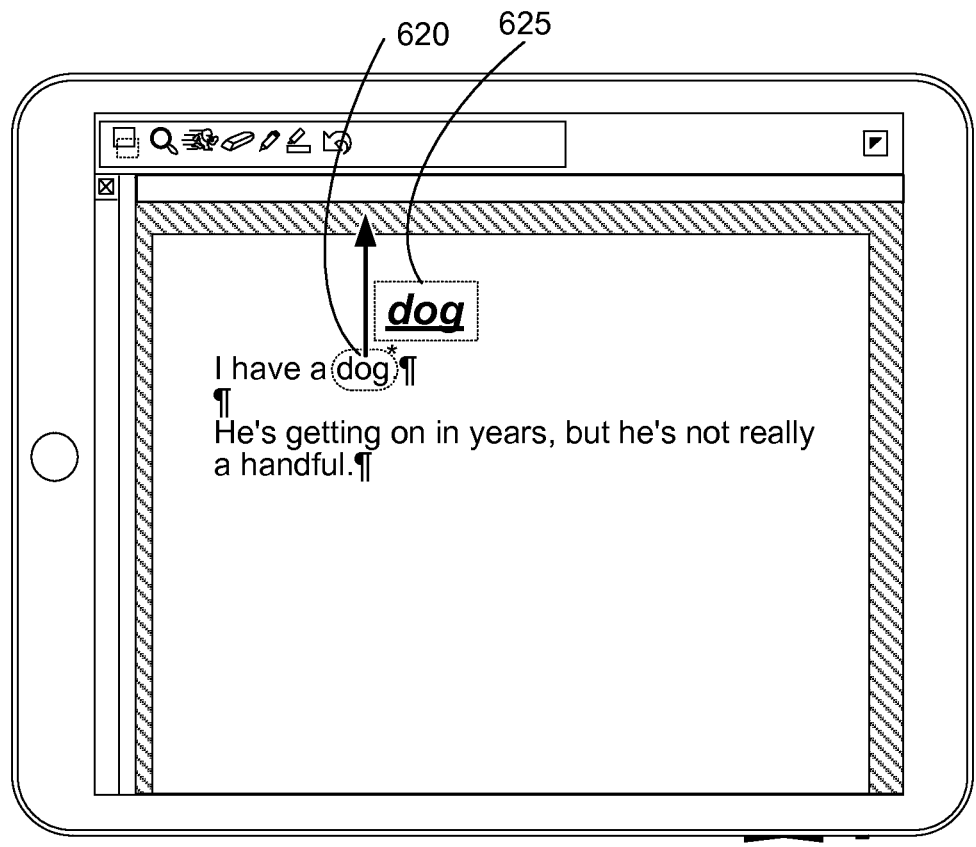

In FIG. 6D, another user input directed at the user interface object is received. The application causes the word to be italicized in response to receiving the user input corresponding to a swipe-left gesture. In FIG. 6E, another user input directed at the user interface object is received. The application causes the word to be underlined in response to receiving the user input corresponding to a swipe-down gesture. In FIG. 6F, another user input directed at the user interface object is received. The application causes the word to be zoomed-in in response to receiving the user input corresponding to a swipe-up gesture. Without having to display multiple controls on the user interface, the application enables the user to edit individual words in a convenient and intuitive manner.

Figure 6G:
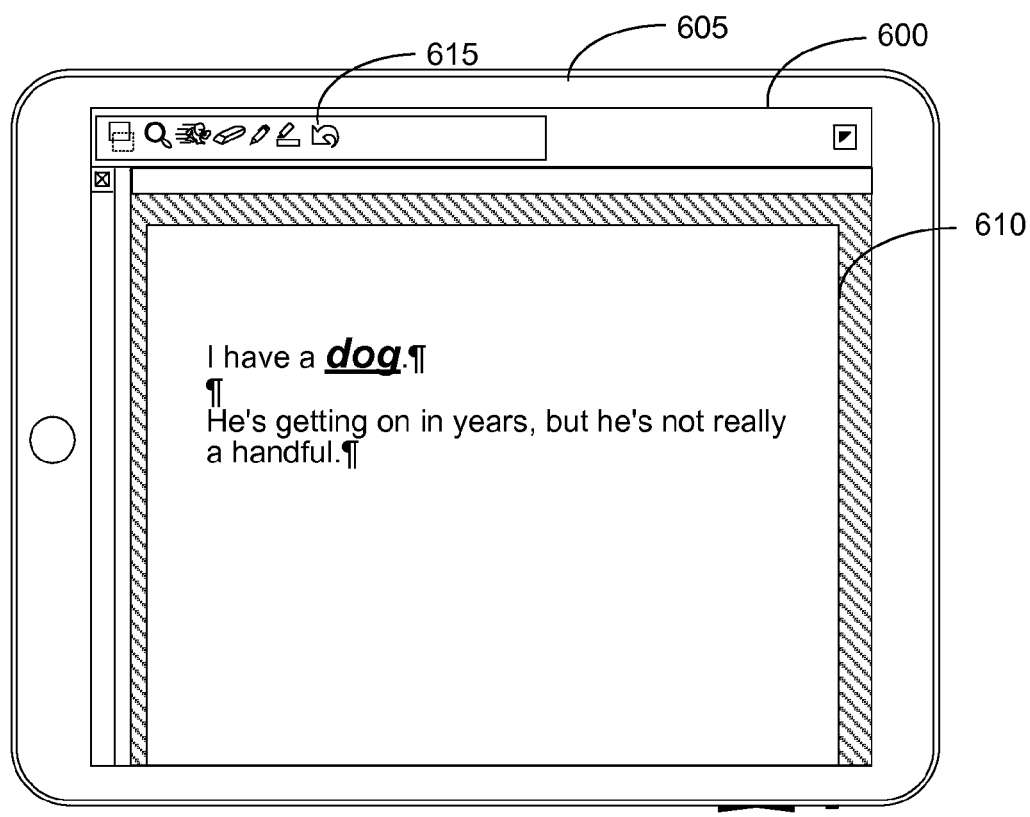

In response to another user input such as a double-tap gesture, the application may incorporate the configuration changes made to the editable-word. As shown in FIG. 6G, the edited-word is now incorporated into the document itself. The user interface object in this example can serve as a preview as to what the text may look like if certain configurations were made to the text. The application can then incorporate the configured text upon user indication to accept the modifications. While FIG. 6 illustrates several examples in configuring the user interface object, there are several other characteristics about the user interface object that can also be configured such as a color or hue, a brightness level, a font type, a zoom level, etc.

V. Computer System

Many of the above-described features and applications can be implemented as software processes that are specified as a set of program instructions encoded on a computer readable storage medium. When these program instructions are executed by one or more processing units, the program instructions cause the processing unit(s) to perform the actions indicated in the instructions. Examples of computer readable storage media include CD-ROMs, flash drives, RAM chips, hard drives, EPROMs, etc. The computer readable storage media does not include carrier waves and electronic signals passing wirelessly or over wired connections. "Software" refers generally to sequences of instructions that, when executed by processing unit(s) cause one or more computer systems to perform various operations, thus defining one or more specific machine implementations that execute and perform the operations of the software programs.

Figure 7:
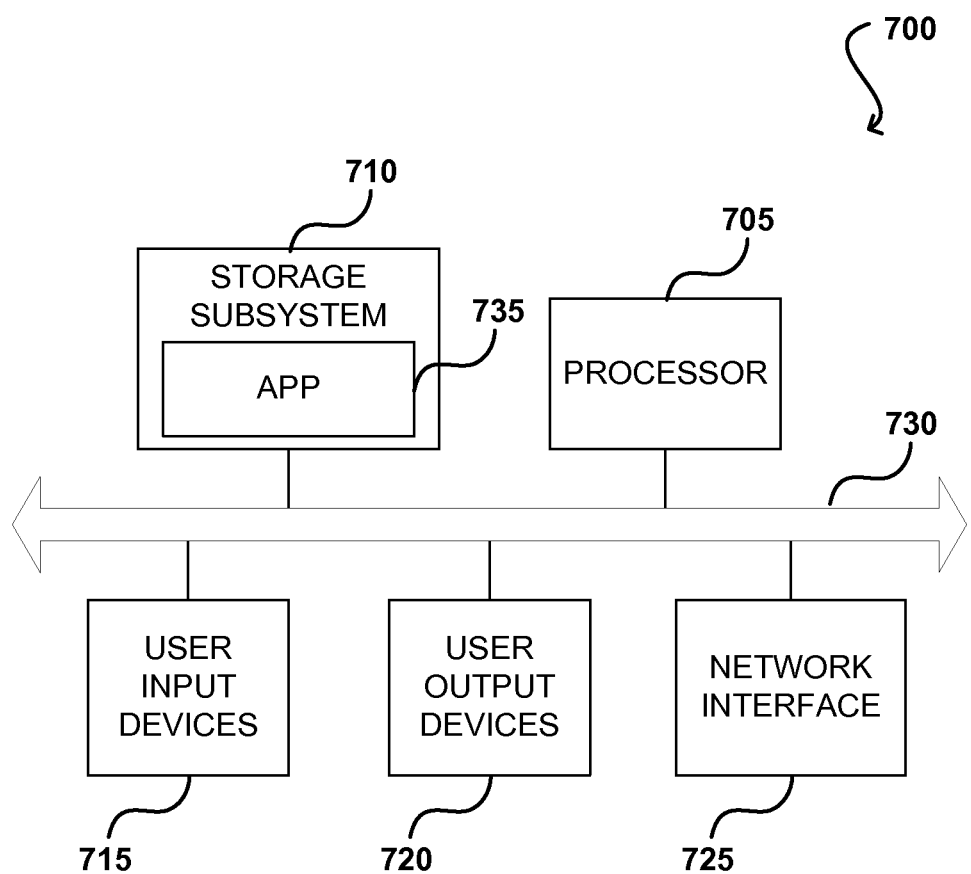
FIG. 7 is a simplified block diagram of a computer system that may incorporate components of the system in FIG. 1 according to some embodiments.

System 100 depicted in FIG. 1 can be incorporated into various systems and devices. FIG. 7 is a simplified block diagram of a computer system 700 that may incorporate components of system 100 according to some embodiments. Computer system 700 can be implemented as any of various computing devices, including, e.g., a desktop or laptop computer, tablet computer, smart phone, personal data assistant (PDA), or any other type of computing device, not limited to any particular form factor. As shown in FIG. 7, computer system 700 can include processing unit(s) 705, storage subsystem 710, input devices 715, output devices 720, network interface 725, and bus 730.

Processing unit(s) 705 can include a single processor, which can have one or more cores, or multiple processors. In some embodiments, processing unit(s) 705 can include a general-purpose primary processor as well as one or more special-purpose co-processors such as graphics processors, digital signal processors, or the like. In some embodiments, some or all processing units 705 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 705 can execute instructions stored in storage subsystem 710.

Storage subsystem 710 can include various memory units such as a system memory, a read-only memory (ROM), and a permanent storage device. The ROM can store static data and instructions that are needed by processing unit(s) 705 and other modules of electronic device 700. The permanent storage device can be a read-and-write memory device. This permanent storage device can be a non-volatile memory unit that stores instructions and data even when computer system 700 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 710 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 710 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 710 can store one or more software programs to be executed by processing unit(s) 705, such as an application 735. As mentioned, "software" can refer to sequences of instructions that, when executed by processing unit(s) 705 cause computer system 700 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 710, processing unit(s) 705 can retrieve program instructions to execute and data to process in order to execute various operations described herein.

A user interface can be provided by one or more user input devices 715, display device 720, and/or and one or more other user output devices (not shown). Input devices 715 can include any device via which a user can provide signals to computing system 700; computing system 700 can interpret the input signals or gestures as indicative of particular user requests or information. In various embodiments, input devices 715 can include any or all of a keyboard touch pad, touch screen, mouse or other pointing device, scroll wheel, click wheel, dial, button, switch, keypad, microphone, and so on.

Output devices 720 can display images generated by electronic device 700 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 720. Examples include indicator lights, speakers, tactile "display" devices, printers, and so on.

In some embodiments, an output device 720 (also referred to as a display 720) can provide a graphical user interface, in which visible image elements in certain areas of display 720 are defined as active elements or control elements that the user selects using user input devices 715. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 720. Other user interfaces can also be implemented.

Network interface 725 can provide voice and/or data communication capability for electronic device 700. In some embodiments, network interface 725 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 725 can provide wired network connectivity (e.g., Ethernet) in addition to or instead of a wireless interface. Network interface 725 can be implemented using a combination of hardware (e.g., antennas, modulators/demodulators, encoders/decoders, and other analog and/or digital signal processing circuits) and software components.

Bus 730 can include various system, peripheral, and chipset buses that communicatively connect the numerous internal devices of electronic device 700. For example, bus 730 can communicatively couple processing unit(s) 705 with storage subsystem 710. Bus 730 also connects to input devices 715 and display 720. Bus 730 also couples electronic device 700 to a network through network interface 725. In this manner, electronic device 700 can be a part of a network of multiple computer systems (e.g., a local area network (LAN), a wide area network (WAN), an Intranet, or a network of networks, such as the Internet. Any or all components of electronic device 700 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 705 can provide various functionality for electronic device 700. For example, processing unit(s) 705 can execute application 735 that can provide various functionality such as the ability to determine an operation (also referred to as command or action) corresponding to different gesture inputs. In some embodiments, application 735 can cause one or more user interface objects to be activated (e.g., displayed) and/or configured based on particular gesture inputs. In some embodiments, application 735 is a stand-alone application or is integrated into another application (e.g., general communications application), while in other embodiments the application might be implemented within an operating system. Further, in some embodiments, the application is provided as part of a server-based solution. The application can be provided via a thin client. That is, the application runs on a server while a user interacts with the application via a separate machine remote from the server. In certain embodiments, the application is provided via a thick client. That is, the application is distributed from the server to the client machine and runs on the client machine.

It will be appreciated that computer system 700 is illustrative and that variations and modifications are possible. Computer system 700 can have other capabilities not specifically described here (e.g., global positioning system (GPS), power management, one or more cameras, various connection ports for connecting external devices or accessories, etc.). Further, while computer system 700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

VI. Cloud Architecture

Figure 8:
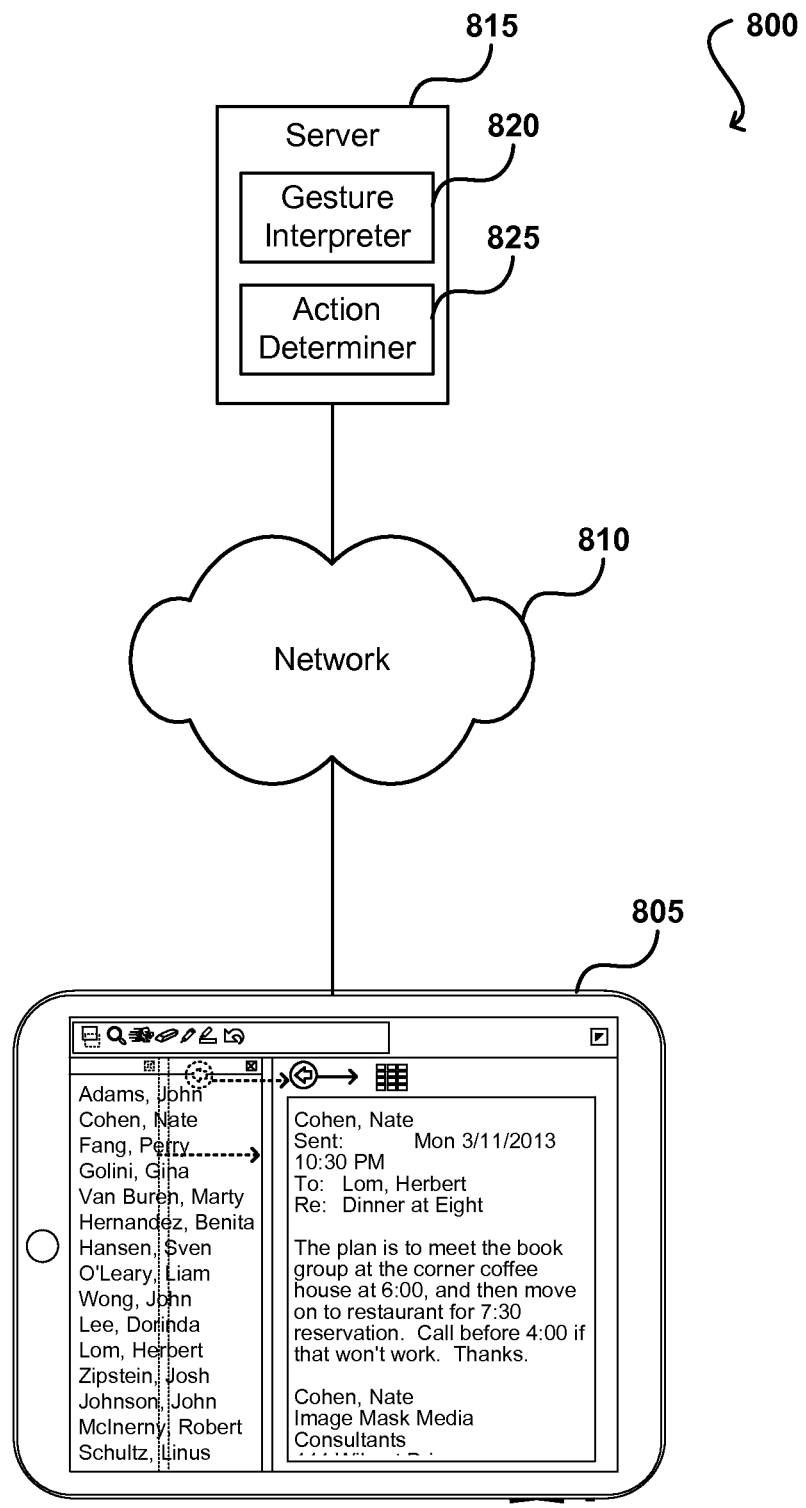
FIG. 8 is a simplified diagram of a distributed system for performing multiple operations based on a gesture input according to some embodiments.

System 100 depicted in FIG. 1 may be provided in various configurations. In some embodiments, system 100 may be configured as a distributed system where one or more components of system 100 may be distributed and coupled via one or more networks. FIG. 8 depicts a simplified diagram of a distributed system 800 for performing multiple operations based on different gesture inputs according to some embodiments. In the embodiment depicted in FIG. 8, gesture interpreter subsystem 820 (e.g., gesture interpreter 110 in FIG. 1) and action determiner subsystem 825 (e.g., action module 115 in FIG. 1) can be provided on a server 815 that is communicatively coupled with a remote client device 805 via network 810.

Network 810 may include one or more communication networks, which could be the Internet, a local area network (LAN), a wide area network (WAN), a wireless or wired network, an Intranet, a private network, a public network, a switched network, or any other suitable communication network. Network 810 may include many interconnected systems and communication links including but not restricted to hardwire links, optical links, satellite or other wireless communications links, wave propagation links, or any other ways for communication of information. Various communication protocols may be used to facilitate communication of information via network 810, including but not restricted to TCP/IP, HTTP protocols, extensible markup language (XML), wireless application protocol (WAP), protocols under development by industry standard organizations, vendor-specific protocols, customized protocols, and others.

In the configuration depicted in FIG. 8, a user of client device 805 may provide a gesture input directed to a single control (also referred to as a single user interface element) using device 805. Upon a first gesture (e.g., a tap gesture) directed at a single control, the first gesture can be communicated to server 815 via network 810. Gesture interpreter 820 located on server 815 can perform analysis to determine a touch and/or gesture event corresponding to the gesture input. In some embodiments, the information used by gesture interpreter 820 for performing the analysis may also be communicated from client device 805 to server 815. In one embodiment, server 815 may also store some of the information used for the analysis or may collect the information from other sources connected to server 815 via network 810. Gesture interpreter 820 may also determine the control or the user interface element toward which the gesture has been performed in some embodiments.

After the particular touch and/or gesture event associated with the user input is determined, the particular touch and/or gesture event can then be communicated to action determiner 820 on server 815. Action determiner 820 can then determine a particular action or operation that corresponds to the particular touch and/or gesture event. Upon determining the particular action or operation (e.g., display a display panel, configure an attribute or characteristic of the display panel), action determiner 825 can then communicate the particular action or operation to client device 805 for output to the user using a display of client device 805.

As described, in some embodiments, upon determining the particular operation or action, action determiner 825 can determine whether persistent information or characteristics can be associated with a user interface object. In one example, upon determining that a first gesture corresponds to an action of displaying a display panel, action determiner 825 can determine whether persisted characteristics associated with the display panel exists. If persisted characteristics associated with the display panel exist, action determiner 825 may then display the display panel on a display of client device 805 using the persisted characteristics determined from a storage device (e.g., storage 120 in FIG. 1). The storage device may be part of client device 805 or server device 815 or may be accessible via network 810 in some embodiments.

In another example, upon determining that a second gesture corresponds to another action of modifying a display panel, action determiner 825 can cause the persisted characteristics associated with the display panel to be saved in a storage device (e.g., storage 120 in FIG. 1). As such, in response to receiving another gesture that causes the display panel to be displayed, action determiner 825 may obtain the desired persisted characteristics and cause the display panel to be displayed with the persisted characteristics.

In the configuration depicted in FIG. 8, gesture interpreter subsystem 820 and action determiner subsystem 825 are remotely located from client device 805. Server 815, including gesture interpreter subsystem 820 and action determiner subsystem 825, provides gesture differentiation services for client 805. In some embodiment, server 815 may provide text-to-gesture differentiation services for multiple clients. The multiple clients may be served concurrently or in a serialized manner. In some embodiments, the services provided by server 815 may be offered as web-based or cloud services or under a Software as a Service (SaaS) model.

It should be appreciated that various different distributed system configurations are possible, which may be different from distributed system 800 depicted in FIG. 8. For example, in some embodiments, gesture interpreter subsystem 820 and action determiner subsystem 825 could also be remotely located from each other. The embodiment shown in FIG. 8 is thus only one example of a system that may incorporate some embodiments and is not intended to be limiting.

What is claimed is:

1. An electronic device comprising:
a display;
a touch-sensitive surface;
memory;
one or more processors; and
one or more programs, wherein the one or more programs are stored in the and are configured to be executed by the one or more processors, the one or more programs including instructions for:
displaying, on the display, a user interface that includes:
a user-selectable item,
a first panel that includes a first object, and,
a second panel that includes a plurality of objects including a second object and a third object;
detecting a gesture directed at the user-selectable item;
in accordance with a determination that the detected gesture directed at the user-selectable item has a first gesture type, performing a first operation that hides the second panel that includes the plurality of objects;
in accordance with a determination that the detected gesture directed at the user-selectable item has a second gesture type, distinct from the first gesture type, performing a second operation that adjusts the second panel, wherein adjusting the second panel includes adjusting sizes of both the second object and the third object, including:
increasing a size of the second object on the display in accordance with the detected gesture while maintaining display of at least a portion of the third object on the display; and
increasing a size of the third object on the display in accordance with the detected gesture while maintaining display of at least a portion of the second object on the display; and,
in accordance with a determination that the detected gesture directed at the user-selectable item has a third gesture type, distinct from the first gesture type and the second gesture type, performing a third operation that is distinct from the first operation and the second operation.

2. The electronic device of claim 1, wherein the detected gesture directed at the user-selectable item having the second gesture type causes a state of the user-selectable item to change from a first state to a second state.

3. The electronic device of claim 2, wherein the state of the user-selectable item is changed from the first state to the second state when a position of the user-selectable item is changed from a first position to a second position, and wherein the change from the first size to the second size of the respective area of the respective object is derived from the change from the first position to the second position of the user-selectable item.

4. The electronic device of claim 1, wherein adjusting the second panel includes adjusting a color of the second panel from a first color to a second color.

5. The electronic device of claim 1, wherein a location of a respective object in the second panel is a persistent visual characteristic such that when the second panel is hidden and then re-displayed, the location of the respective object in the second panel prior to hiding the second panel is maintained when the second panel is re-displayed.

6. The electronic device of claim 1, wherein the respective object of the plurality of objects is a thumbnail image.

7. The electronic device of claim 1, wherein the first gesture type is a tap gesture and the second gesture type is a drag gesture.

8. The electronic device of claim 1, wherein the third operation includes adjusting at least one of the color and the brightness of the second panel.

9. The electronic device of claim 1, wherein the second gesture type is a horizontal displacement of the user-selectable item and the third gesture type is a vertical displacement of the user-selectable item.

10. A non-transitory computer readable storage medium storing one or more programs, the one or more programs comprising instructions, which when executed by an electronic device with a display and a touch-sensitive surface, cause the device to:
 display, on the display, a user interface that includes:
  a user-selectable item,
  a first panel that includes a first object, and,
  a second panel that includes a plurality of objects including a second object and a third object;
 detect a gesture directed at the user-selectable item;
 in accordance with a determination that the detected gesture directed at the user-selectable item has a first gesture type, perform a first operation that hides the second panel that includes the plurality of objects;
 in accordance with a determination that the detected gesture directed at the user-selectable item has a second gesture type, distinct from the first gesture type, perform a second operation that adjusts the second panel, wherein adjusting the second panel includes adjusting sizes of both the second object and the third object, including:
  increasing a size of the second object on the display in accordance with the detected gesture while maintaining display of at least a portion of the third object on the display; and
  increasing a size of the third object on the display in accordance with the detected gesture while maintaining display of at least a portion of the second object on the display; and,
 in accordance with a determination that the detected gesture directed at the user-selectable item has a third gesture type, distinct from the first gesture type and the second gesture type, perform a third operation that is distinct from the first operation and the second operation.

11. The computer readable storage medium of claim 10, wherein the detected gesture directed at the user-selectable item having the second gesture type causes a state of the user-selectable item to change from a first state to a second state.

12. The computer readable storage medium of claim 11, wherein the state of the user-selectable item is changed from the first state to the second state when a position of the user-selectable item is changed from a first position to a second position, and wherein the change from the first size to the second size of the respective area of the respective object is derived from the change from the first position to the second position of the user-selectable item.

13. The computer readable storage medium of claim 10, wherein adjusting the second panel includes adjusting a color of the second panel from a first color to a second color.

14. The computer readable storage medium of claim 10, wherein a location of a respective object in the second panel is a persistent visual characteristic such that when the second panel is hidden and then re-displayed, the location of the respective object in the second panel prior to hiding the second panel is maintained when the second panel is re-displayed.

15. The computer readable storage medium of claim 10, wherein the respective object of the plurality of objects is a thumbnail image.

16. The computer readable storage medium of claim 10, wherein the first gesture type is a tap gesture and the second gesture type is a drag gesture.

17. The computer readable storage medium of claim 10, wherein the third operation includes adjusting at least one of the color and the brightness of the second panel.

18. The computer readable storage medium of claim 10, wherein the second gesture type is a horizontal displacement of the user-selectable item and the third gesture type is a vertical displacement of the user-selectable item.

19. A method, comprising:
 at an electronic device with a display and a touch-sensitive surface:
  displaying, on the display, a user interface that includes:
   a user-selectable item,
   a first panel that includes a first object, and,
   a second panel that includes a plurality of objects including a second object and a third object;
  detecting a gesture directed at the user-selectable item;
  in accordance with a determination that the detected gesture directed at the user-selectable item has a first gesture type, performing a first operation that hides the second panel that includes the plurality of objects;
  in accordance with a determination that the detected gesture directed at the user-selectable item has a second gesture type, distinct from the first gesture type, performing a second operation that adjusts the second panel, wherein adjusting the second panel includes adjusting sizes of both the second object and the third object, including:
   increasing a size of the second object on the display in accordance with the detected gesture while maintaining display of at least a portion of the third object on the display; and
   increasing a size of the third object on the display in accordance with the detected gesture while maintaining display of at least a portion of the second object on the display; and,
  in accordance with a determination that the detected gesture directed at the user-selectable item has a third gesture type, distinct from the first gesture type and the second gesture type, performing a third operation that is distinct from the first operation and the second operation.

* * * * *

UNITED STATES PATENT AND TRADEMARK OFFICE
CERTIFICATE OF CORRECTION

PATENT NO. : 9,639,238 B2  
APPLICATION NO. : 14/069522  
DATED : May 2, 2017  
INVENTOR(S) : Wagner Page 1 of 1

It is certified that error appears in the above-identified patent and that said Letters Patent is hereby corrected as shown below:

In the Claims

Claim 1, Column 20, Line 8, please delete "in the and are" and insert --in the memory and are--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*